US012748840B2

(12) United States Patent
Cohen

(10) Patent No.: US 12,748,840 B2
(45) **Date of Patent: *Sep. 29, 2026**

(54) SYSTEMS AND METHODS FOR INTERPRETER BASED APPLICATION CYBERSECURITY

(71) Applicant: Seraphic Algorithms Ltd., Tel-Aviv (IL)

(72) Inventor: Avihay Cohen, Tel-Aviv (IL)

(73) Assignee: Seraphic Algorithms Ltd., Tel-Aviv (IL)

( * ) Notice: Subject to any disclaimer, the term of this patent is extended or adjusted under 35 U.S.C. 154(b) by 15 days.

This patent is subject to a terminal disclaimer.

(21) Appl. No.: 18/762,967

(22) Filed: Jul. 3, 2024

(65) Prior Publication Data

US 2024/0362321 A1 Oct. 31, 2024

Related U.S. Application Data

(63) Continuation of application No. 18/686,631, filed as application No. PCT/IB2022/051699 on Feb. 25, (Continued)

(51) Int. Cl.

| | |
|---|---|
| ***G06F 21/55*** | (2013.01) |
| ***G06F 8/65*** | (2018.01) |
| ***G06F 9/455*** | (2018.01) |
| ***G06F 9/54*** | (2006.01) |
| ***G06F 21/12*** | (2013.01) |
| ***G06F 21/54*** | (2013.01) |

(52) U.S. Cl.

CPC .............. *G06F 21/554* (2013.01); *G06F 8/65* (2013.01); *G06F 21/128* (2013.01); *G06F 21/54* (2013.01);

(Continued)

(58) Field of Classification Search

CPC ........ G06F 21/554; G06F 8/65; G06F 21/128; G06F 21/54; G06F 9/45529; G06F 9/54;

(Continued)

(56) References Cited

U.S. PATENT DOCUMENTS 9,438,625 B1 9/2016 Yang
2009/0254994 A1* 10/2009 Waterson .............. G06F 21/554 719/321

(Continued)

FOREIGN PATENT DOCUMENTS

WO 2018006241 A1 11/2018

OTHER PUBLICATIONS

International Search Report issued in PCT/IB22/51699 dated May 13, 2022 (2 pages).

(Continued)

*Primary Examiner* — Theodore C Parsons
*Assistant Examiner* — Howard H. Louie
(74) *Attorney, Agent, or Firm* — Womble Bond Dickinson (US) LLP

(57) ABSTRACT

A non-transitory computer readable medium contains instructions that when executed cause one or more processors to perform cybersecurity operations that include detecting an interpreter-based application configured to exhibit native functionality and to generate a plurality of execution contexts following receipt of an original input code. An interpreter-based cybersecurity agent is injected within the detected interpreter-based application, which is itself configured for execution by the interpreter-based application prior to execution of the original input code. Exposed APIs are patched using the injected interpreter-based cybersecurity agent to cause patched APIs to exhibit non-native functionality in order to thwart exploitations.

18 Claims, 21 Drawing Sheets

Related U.S. Application Data

2022, now Pat. No. 12,579,262, which is a continuation-in-part of application No. PCT/IL2021/051062, filed on Aug. 31, 2021.

(60) Provisional application No. 63/072,581, filed on Aug. 31, 2020.

(52) U.S. Cl.
CPC ............ *G06F 9/45529* (2013.01); *G06F 9/54* (2013.01); *G06F 2221/033* (2013.01)

(58) Field of Classification Search
CPC .... G06F 2221/033; G06F 9/455; G06F 21/12; G06F 21/55
See application file for complete search history.

(56) References Cited

U.S. PATENT DOCUMENTS

2010/0146589 A1* 6/2010 Safa ........................ G06F 21/52 711/E12.001
2012/0089695 A1* 4/2012 Fainberg ............... G06F 15/167 709/213
2015/0088970 A1* 3/2015 Wei ......................... H04L 67/02 709/203
2015/0163248 A1 6/2015 Epstein
2018/0205705 A1 7/2018 Kupferschmied et al.
2019/0095616 A1 3/2019 Drapeau et al.
2021/0026969 A1 1/2021 Hod et al.
2021/0029170 A1 1/2021 Gupta et al.

OTHER PUBLICATIONS

Written Opinion of the International Searching Authority issued in PCT/IB22/51699 dated May 13, 2022 (12 pages).
Sachin, Vijetha, et al. "Surfguard JavaScript Instrumentation-based Defense against Drive-by downloads", Recent Advances in Computing and Software Systems (RACESS), 2012 International Conference on, IEEE, Apr. 25, 2012, pp. 267-272.
Mandal, Debasish, "Browser Exploits? Grab 'em by the Collar?", Oct. 26, 2017, pp. 1-68.
Extended European Search Report in European Patent Application No. 22863711.2-1218/4396711 PCT/IB2022051699 dated Apr. 24, 2025 (9 pages).

* cited by examiner

EXAMPLE MAPPING

```
simpleArray[0]  →  decode(Inner_Object1[0])
simpleArray[1]  →  decode(Inner_Object2[1])
simpleArray[2]  →  decode(Inner_Object3[2])
simpleArray[3]  →  decode(Inner_Object1[1])
simpleArray[4]  →  decode(Inner_Object3[3])
simpleArray[5]  →  decode(Inner_Object1[3])
simpleArray[6]  →  decode(Inner_Object2[3])
simpleArray[7]  →  decode(Inner_Object2[2])
```

FIG. 4D

SYSTEMS AND METHODS FOR INTERPRETER BASED APPLICATION CYBERSECURITY

CROSS-REFERENCE TO RELATED APPLICATIONS

This application is a continuation of U.S. application Ser. No. 18/686,631, filed Feb. 26, 2024, which is a U.S. national phase entry under 35 U.S.C. § 371 of International Patent Application No. PCT/IB2022/051699, filed on Feb. 25, 2022, which is a continuation-in-part of International Application No. PCT/IL2021/051062, filed on Aug. 31, 2021, which claims priority from U.S. Provisional Patent Application No. 63/072,581, filed Aug. 31, 2020. The contents of the above-noted applications are incorporated by reference herein in their entireties.

TECHNICAL FIELD

Disclosed embodiments relate to the field of cyber defense, and more specifically to browser and other JavaScript enabled applications exploit prevention and malicious code neutralization.

BACKGROUND

Cyber defense techniques largely fall into two categories. Signature-based intrusion detection systems (IDSs) typically detect security breaches based on patterns and similarities to known threats. For example, IDSs may monitor network traffic and determine sequences and patterns based on a list of known indicators of compromise (IOCs). However, signature-based IDS solutions are not suitable for detecting unknown attacks, or bypassing schemes.

By contrast, signatureless detection systems may employ dynamic approaches, machine learning, and data analytics to detect anomalies and suspicious behavior. For example, unusual patterns relating to traffic, timing, or central processing unit (CPU) consumption may indicate a security breach.

Web browsers are common targets of attack vectors. Web browsers are software applications that enable access to the World Wide Web (WWW). The web browser retrieves content from a web server as program code instructions, typically written in a combination of interpretive languages, such as hypertext markup language (HTML), Cascading Style Sheet (CSS), and JavaScript. The web browser transforms the program code instructions into an image that is displayed on the user's computer screen. The interpretive instruction set has several inherent, or built-in objects, referred to herein as "native objects". Native objects are typically accessible anywhere within a programming application, and are configured to operate in a predictable manner, independent of a particular browser or operating system.

Most web browsers include an interpretive engine, such as a JavaScript engine, to interpret instructions into executable machine code for execution by the CPU of the host device. An interpretive engine typically includes an interpreter and one or more just-in-time compilers for converting the interpretive instructions to executable code during runtime.

In some situations, an interpreter may directly execute instructions without requiring advance compilation to machine language. To execute a program, an interpreter may perform one or more of the following: parse the instructions from the source code and cause them to be performed directly, translate code instructions to an intermediate representation or object code for immediate execution, or explicitly execute code precompiled by a compiler and stored in advance and then matched via an interpreter Virtual Machine.

Interpretive language instructions typically include one or more references to Application Programming Interfaces (APIs). APIs allow the computer running the interpretive engine to interface with other computers and/or software applications. Invoking an API typically invokes a pre-written software application to send and/or receive data, simplifying webpage development.

Attack vectors may exploit vulnerabilities that are exposed when invoking the API and inject malicious code into a victim's device. To mitigate exploits, techniques such as Address Space Layout Randomization (ASLR), Data Execution Prevention (DEP), Control Flow Guard (CFG), sandbox, Enhanced Mitigation Experience Toolkit (EMET) have been developed. However, these techniques merely raise the bar for exploiting additional vulnerabilities.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, computer readable media and methods which are meant to be exemplary and illustrative, not limiting in scope.

There is provided, in accordance with an embodiment, a non-transitory computer readable medium containing instructions that when executed by at least one processor cause the at least one processor to perform cybersecurity operations comprising: detecting at least one interpreter-based application, wherein the interpreter-based application is configured to exhibit native functionality and to generate a plurality of execution contexts following receipt of an original input code; injecting an interpreter-based cybersecurity agent (IBCA) within the at least one detected interpreter-based application, wherein the injected interpreter-based cybersecurity agent is configured for execution prior to execution of the original input code by the interpreter-based application; and patching exposed application programming interfaces using the injected interpreter-based cybersecurity agent, wherein the patching is configured to cause patched application programming interfaces to exhibit non-native functionality different from the native functionality, and wherein the non-native functionality differs for differing execution contexts of the interpreter-based application in order to thwart exploitations.

In some embodiments, the IBCA is implemented as a JavaScript cybersecurity agent, and the interpreter-based application is implemented as a JavaScript enabled application.

There is also provided, in accordance with an embodiment, a non-transitory computer-readable medium containing instructions executable by at least one processor to perform operations for neutralizing malicious code, the operations comprising: accessing an interpreter-based application associated with a first execution context having at least one first-execution-context exposed API; executing a first intercepting code prior to execution of first-execution-context input code, the first intercepting code being configured to patch the at least one first-execution-context exposed API; determining whether the first-execution-context input code generates a second execution context having at least one second-execution-context exposed API; and executing a second intercepting code prior to execution of second-execution-context input code, the second intercepting code being configured to patch the at least one second-execution-context exposed API.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

FIGS. 4A, 4B, 4C, and 4D illustrate an exemplary visualization of a method for a chaotic manipulation of input data for JavaScript object creation, consistent with some embodiments of the present disclosure.

FIG. 8-1 illustrates an exemplary implementation of a system for performing cybersecurity operations, consistent with some embodiments of the present disclosure.

FIG. 8-2 illustrates a flowchart of a method for performing cybersecurity operations, consistent with some embodiments of the present disclosure.

FIGS. 8-3A and 8-3B illustrate an exemplary implementation for manipulating a runtime environment to inhibit the freeing of memory, consistent with some embodiments of the present disclosure.

FIG. 9-1B illustrates an example of execution contexts with patched APIs and a set of intercepting code, consistent with some embodiments of the present disclosure.

FIG. 9-1C illustrates an example of execution contexts with patched APIs and multiple intercepting codes, consistent with some embodiments of the present disclosure.

FIG. 9-2 is a block diagram of an exemplary process for neutralizing malicious code, consistent with some embodiments of the present disclosure.

DETAILED DESCRIPTION

Figure 1:
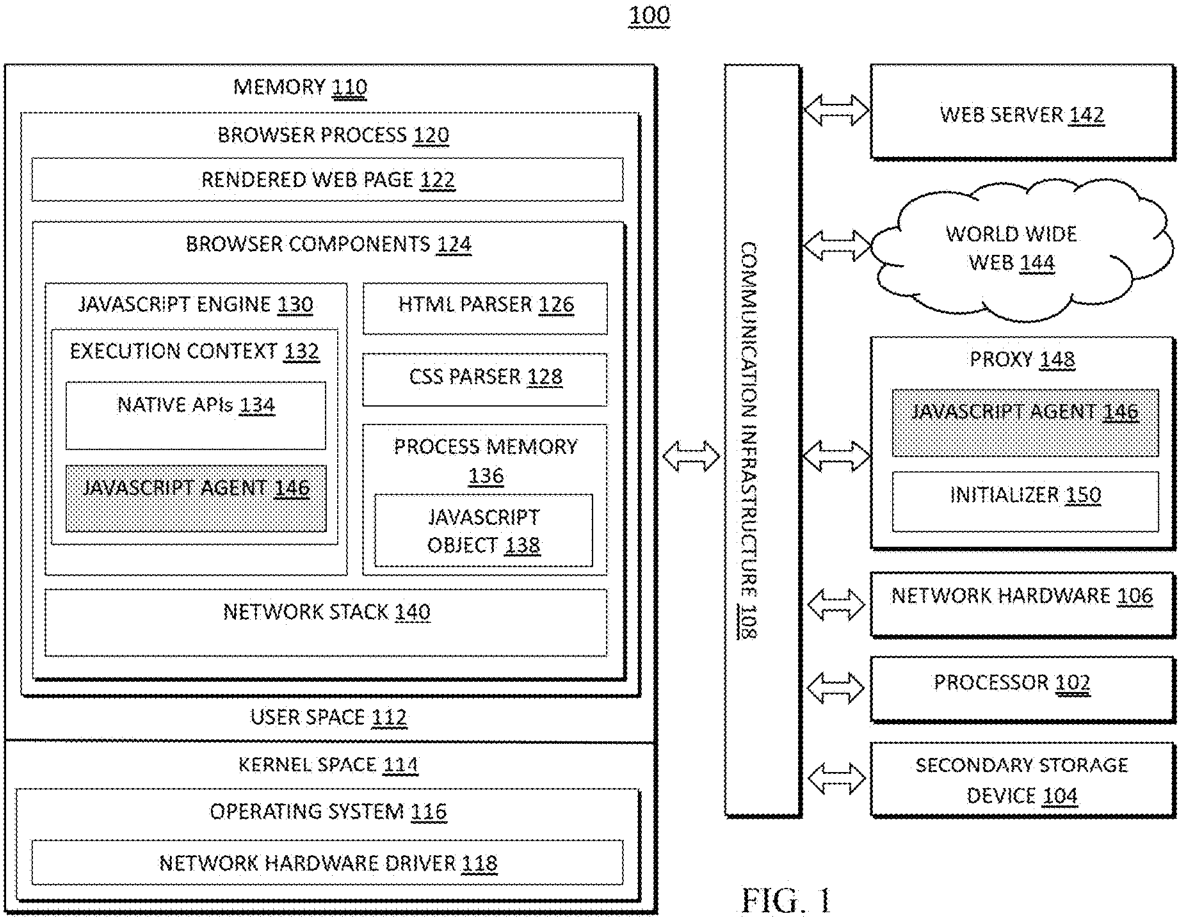
FIG. 1 depicts components of a computer system and browser environment, consistent with some embodiments of the present disclosure.

Disclosed herein is a technique, embodied in a system, method, and computer program product, for automated neutralizing of malicious code in a computer system. In some embodiments, the present disclosure provides for various approaches for exploit prevention and malicious code neutralization.

Typically, a malicious code trying to exploit a vulnerability in an interpreter-based application first triggers the vulnerability. The malicious code then constructs artifacts for successful exploitation. In most cases, this is reflected in achieving code execution.

Typically, exploiting an interpreter based application vulnerability requires carefully constructed payloads, both for triggering the vulnerability and for implementing further exploitation, especially for attacks attempting to circumvent exploit mitigation techniques, such as address space layout randomization (ASLR) and/or data execution prevention (DEP). A common artifact employed by interpreter-based application exploits is the use of environment complex primitives, such as typed array objects. The exploitation process often depends on the predictable behavior of application programming interfaces (APIs). For example, a given exploit may create an array to hold a shellcode payload pending execution. Under normal conditions, the array creation process results in predictable behavior. Consequently, the created array will hold its corresponding backstage object with a predictable offset between the nodes, or with predictable properties, such as array length and/or type.

Accordingly, in some embodiments, the present disclosure provides for manipulating API invocations of the interpreter engine in interpreter-based applications, such that the effect of the original API calls on the underlying environment state will be unpredictable. For example, manipulations may cause an object created by malicious code to reside in an unpredictable memory location having an unpredictable structure, or within multiple execution contexts. The object may have various random properties, such as length and/or random node ordering, and/or other inline properties, such as random strings, random interrupts, INT3 instructions, and the like. In some embodiments, the code may be manipulated by padding and/or encoding the payload. The created object may be stored in an internal mapping such that behavior of other components, like a garbage collector freeing memory, will also be unpredictable.

It is noted that the manipulated, or "chaotic" execution approach of the present disclosure may apply to all executable code, legitimate and malicious alike. The chaotic execution may inhibit (e.g., prevent) malicious code relying on the predictable behavior of API invocations from fulfilling its malicious intent. At the same time, the present disclosure describes generating and storing a mapping between the original and manipulated, "chaotic," execution parameters. This enables the present technique to return the intended values of read operations of the input code. Thus, the present disclosure may enable legitimate code to execute as intended.

In some embodiments, in order for API invocations to be manipulated, native APIs may be patched to enable their interception. Manipulation may be performed only on invocations used to manipulate the environment state. Manipulation may be performed in a randomized "chaotic" manner. A mapping may be generated and stored between the original and manipulated state. In this manner, valid code may refer to the mapping to obtain intended values for read/write operations. However, malicious code cannot rely on a predictable memory layout/stored payload data due to the manipulation, and may be neutralized. Since the vulnerability will not be triggered, the malicious payload will not execute.

A method for a computing device is described herein. The method may include executing an interpreter-based agent cybersecurity (IBCA) prior to any other code, by an application capable of Interpreter based execution. Exposed native APIs of the application may be patched. Native API calls invoked by interpreted code in a current execution context may be intercepted. Intercepted API calls that are used for back store allocation, user-controlled input, and/or affect the environment state may be manipulated in a chaotic randomized manner, so that the effect of the original API call on the underlying environment state/stored data will be unpredictable (e.g., an unpredictable memory layout 226). A mapping between the original and manipulated states may be generated and/or stored. The generated mapping may be used to respond and return intended values to read/write operations by the intercepted API calls. This may ensure that complete functionality for the high-level code is maintained, while code relying on a predictable behavior of the environment components may to fulfill any malicious intent. In some embodiments, a proxy object may be created and returned to the original invocation. The proxy object may use the mapping to respond and return the intended value to read operations by the intercepted API calls so that complete functionality for the high-level code is maintained.

In one embodiment of the present method, the injection of the IBCA may be performed using at least one of:

- A proxy (on premise/off premise-cloud based);
- application extension;
- privileged operating system (OS) agent; and/or
- as a package.

In some embodiments, the application is a JavaScript enabled application and at least some of the received code is a web page. In some embodiments, the manipulation of input data may include any combination of one or more of the following actions:

- Encoding at least some randomly selected arguments in the input data;
- dividing the input data into a random number of execution contexts (e.g., inline frames, objects, augmented execution);
- splitting the input data into a random number of subsets of the input data; and/or
- padding at least some randomly selected arguments in the input data with random data of the same type;
- storing object references by the IBCA, such that the reference to the object will not be freed or collected by a garbage collector;
- adding inline properties to the created object; and/or
- randomly allocating new backing store objects in memory, where each object may contain a random number of properties and primitives of random lengths, resulting in a more robust "chaotic" memory allocation behavior for the underlying interpreter engine.

Figure 5A:
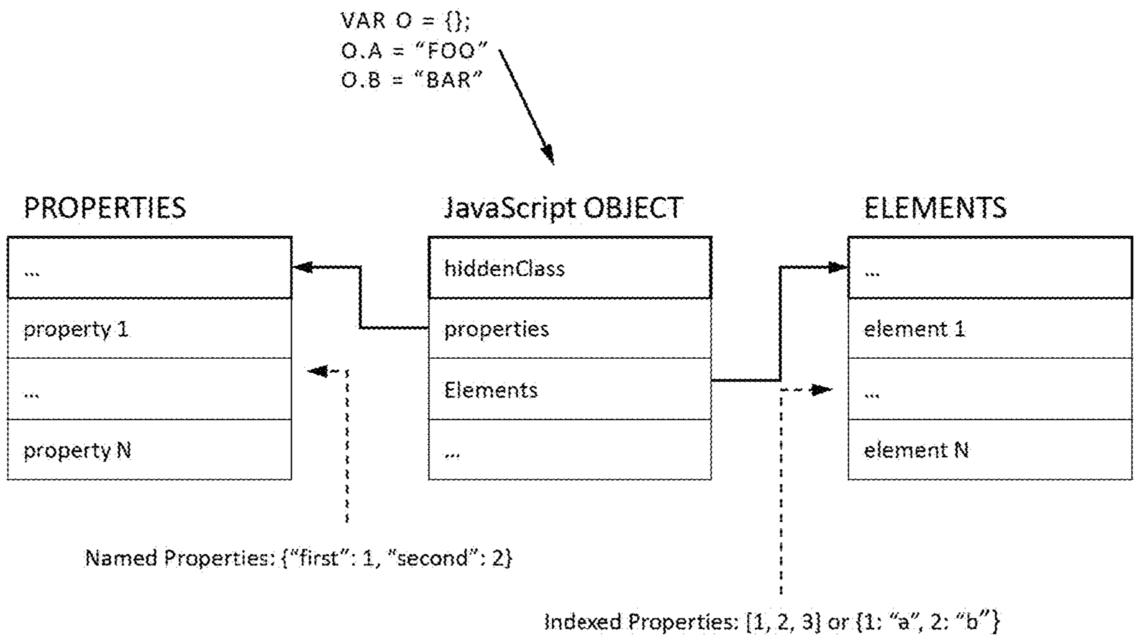
FIGS. 5A, 5B, and 5C illustrate a process for adding inline properties to a JavaScript object, consistent with some embodiments of the present disclosure.
Figure 5B:
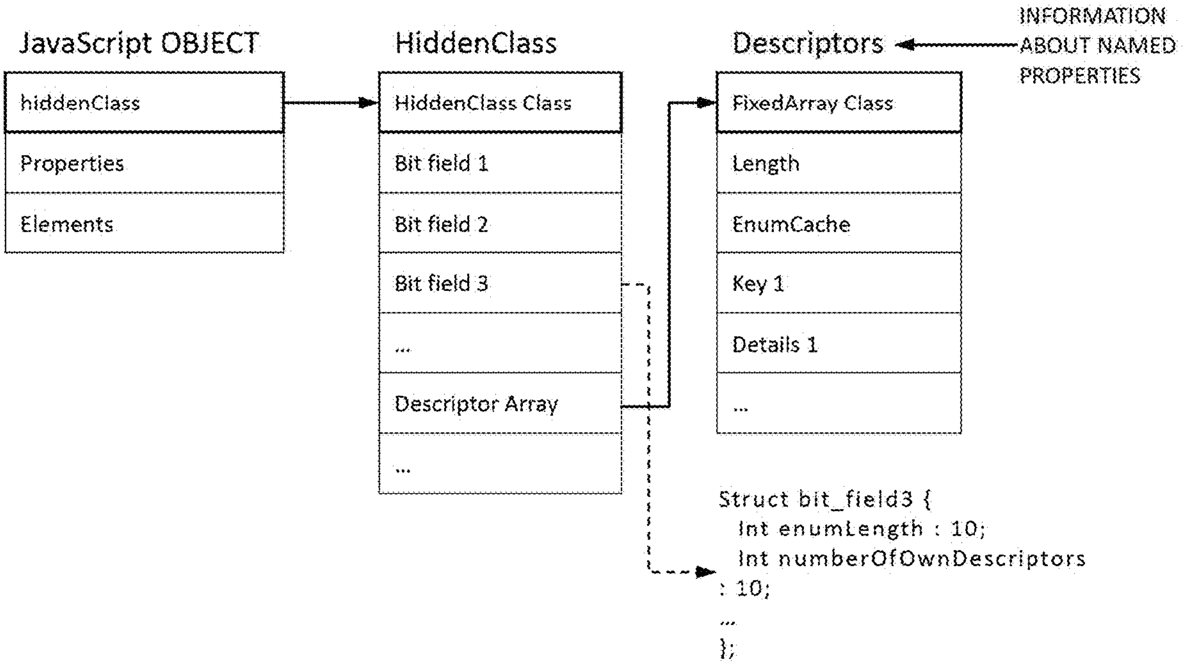
Figure 5C:
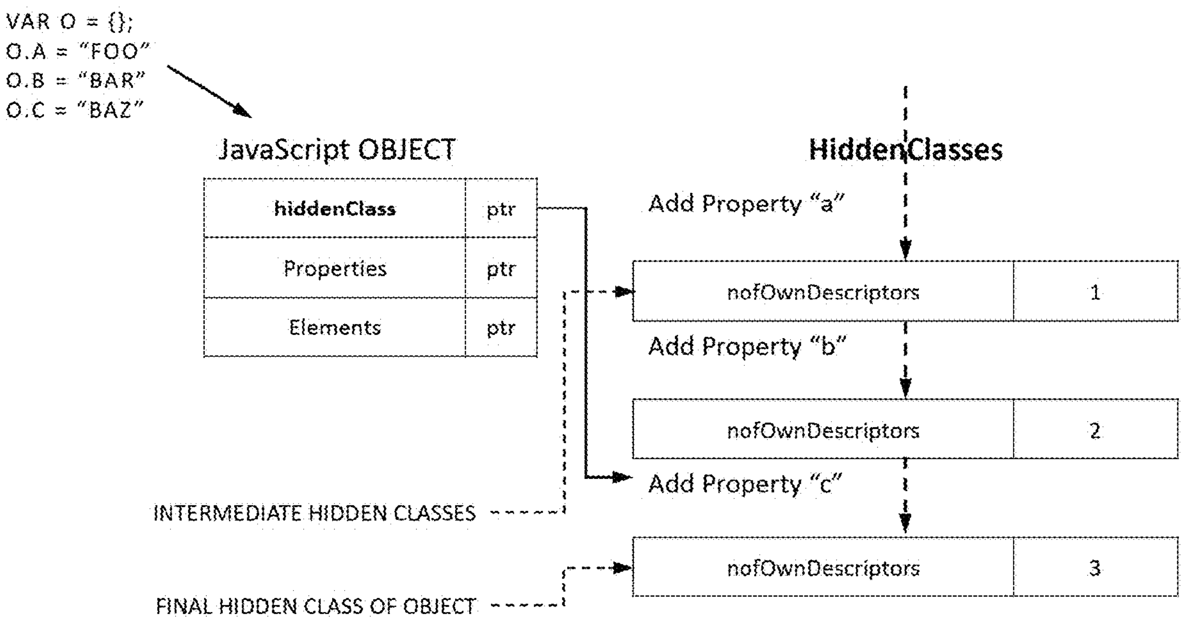

For example, a random number of properties containing primitive values may be added and set as non-enumerable with a Symbol as the property key. As another example, an object "o" may be defined with a random Symbol as a property key, and a value equal to some_primitive (e.g., 10101010). The object descriptor may be set to non-enumerable and non-configurable, causing direct manipulation of the backing store object to create an unpredictable variant. FIGS. 5A and 5B show a schematic depiction of a simple object {a: "foo", b: "bar"}. This object has two named properties, "a" and "b," and two elements or array-indexed properties: 0, with the value "foo", and 1, with the value "bar." FIG. 5B depicts the classes HiddenClasses and DescriptorArrays. HiddenClass stores meta information about an object, including the number of properties on the object and a reference to the object's prototype. HiddenClasses may be created on the fly and updated dynamically as objects change. HiddenClasses serve as an identifier for the shape of an object and thus may be important for V8's optimizing compiler and inline caches. FIG. 5C depicts an addition of a property to the object (e.g., c: "baz"). When a new property is added, the object's HiddenClass may be changed. A transition tree may be created in the background, which may link the HiddenClasses together.

Figure 6A:
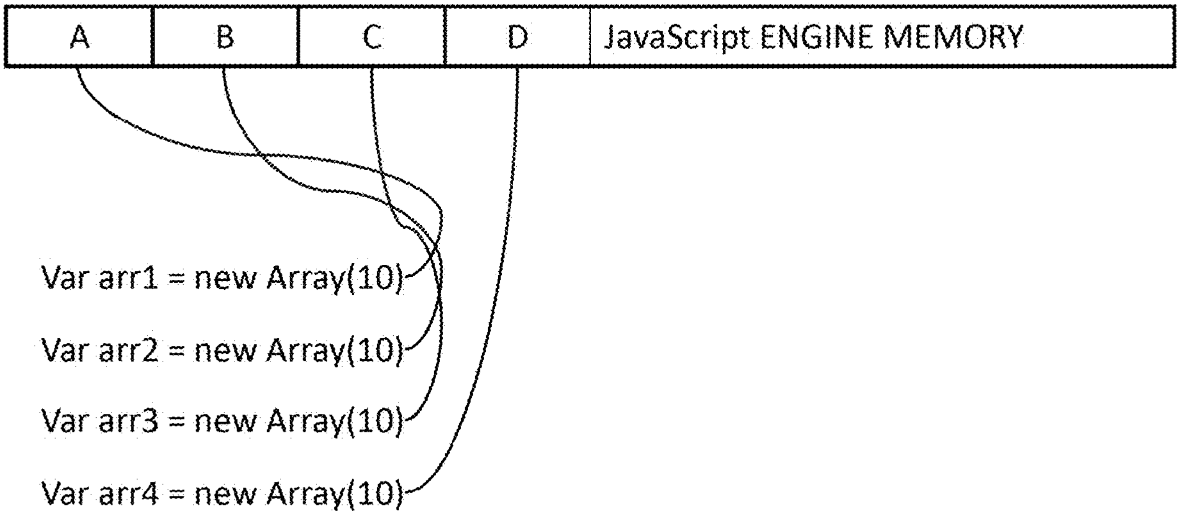
FIGS. 6A and 6B depicts random memory allocation manipulation, consistent with some embodiments of the present disclosure.
Figure 6B:
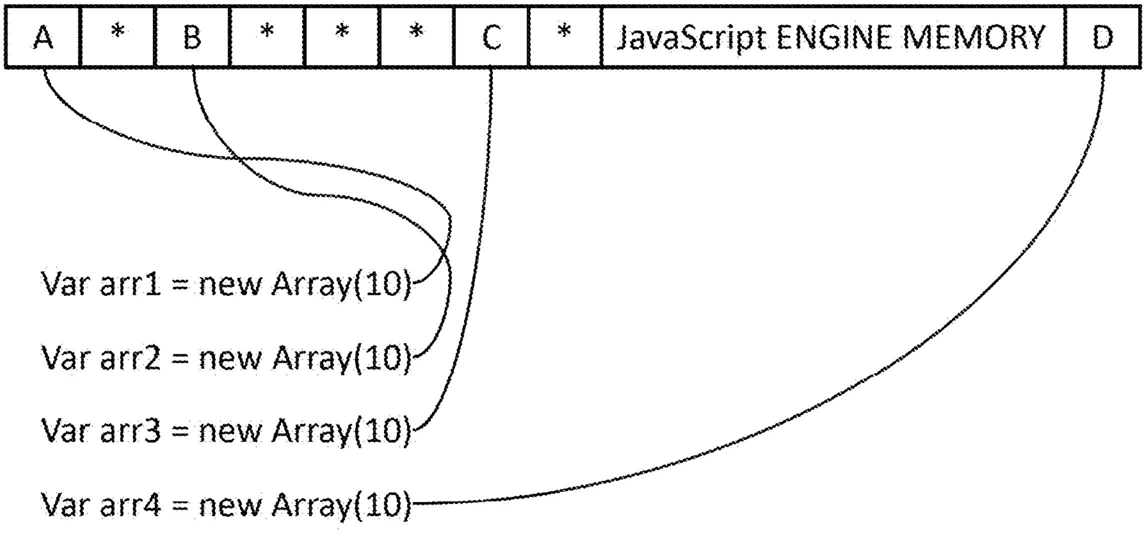

As another example, if a given code creates a new array object [new_Array(100)], JSA 146 may allocate a random number of randomly-created objects, before and/or after memory is allocated for the new array object. As a result, the memory allocation of the interpreter engine becomes more "chaotic." FIGS. 6A and 6B schematically depict this random memory allocation manipulation. In FIG. 6A, during normal execution, the allocator behavior may be predictable, such that if the address for array "arr1" is known, it may be used to determine the addresses for other array objects arr2, arr3, arr4, etc. Conversely, as can be seen in FIG. 6B, during random memory allocation, a random number of objects may be allocated, causing the memory allocation behavior to be unpredictable. In some embodiments, JSA 146 may allocate a stack of multiple native objects that are stored internally. Subsequently, when a given code tries to allocate an object of the same type, the object stored internally may be returned instead, making the allocator behavior even more unpredictable.

In one embodiment, at least some of the execution contexts are inline frames. In one embodiment, when an API call is intercepted, a new object may be created.

Manipulations may include at least one of:

- Splitting and rearranging arguments into random subsets of arguments; and/or
- creating, for each of the subsets, a separate object within one of the different execution contexts.

In one embodiment, when an API call is intercepted, a new array object may be generated. Input data may include arguments associated with the array object. The manipulation may include at least one of:

- Splitting and rearranging the arguments into random subsets of arguments; and/or
- generating, for each of the subsets, a separate array object within one of the different execution contexts.

In one embodiment, the mapping may include a location of each of the arguments within the different execution contexts. In one embodiment, API invocations may be intercepted from available execution contexts associated with the execution. In one embodiment, the mapping may include a reference to a location of at least one of the objects. The reference may be freed in a random manner based on a unique seed upon the occurrence of a specified condition.

As indicated above, interpreter-based engine exploits may follow common patterns. An exploit writer typically attempts to build abstract primitives that grant freedom to corrupt memory, e.g., by gaining out-of-bounds (OOB)

memory access and/or by allowing to read or write data at the process memory address space. However, by creating a chaotic execution environment, the present method thwarts this capability, and the intended purpose of the malicious code may not be affected. Specifically, because many exploits rely on generating objects (e.g., arrays, storing raw byte code in memory, and/or freeing objects under specific conditions), by executing the API invocations in a chaotic and unpredictable manner, an attacker may not be able to rely on the results of specific API invocations on the underlying environment, and thus may not be able to carry out the attack as intended.

For example, when allocating a typed array using a relevant API (a common action that browser exploits use when exploiting memory corruption), an attacker may rely on the layout or structure of the allocated object to achieve successful exploitation. To create a chaotic execution environment using the browser API, multiple execution contexts may be created (e.g., via multiple inline frame objects), in a manner that causes the browser to allocate multiple memory sections for the multiple contexts. When the executed code invokes the relevant API (e.g., an array constructor) to allocate a new array, the software agent (e.g., IBCA) may intercept the invocation, and may split the original invocation arguments randomly into multiple arrays corresponding to the multiple execution contexts. In some embodiments, an argument may also be processed, e.g., by data padding, encoding, or other manipulations. In one embodiment, when a malicious exploit code attempts to allocate an array to hold its shellcode for further exploitation, the shellcode may reside in memory locations across multiple different execution contexts. The shellcode may also be encoded with a random key, and thus may be prevented from executing as intended.

In another embodiment, the method may inhibit (e.g., prevent) malicious attempts to perform a buffer-overflow attack. Buffer overflow attacks occur when an attacker provides malformed input to a program, causing the input to be written incorrectly to areas outside the allotted memory location. Direct overflow attacks try to overwrite the return pointer on the stack, whereas indirect attacks try to overwrite a function pointer stored on the heap, and that is later dereferenced. In this regard, interpreter-based applications have a built-in "garbage collector" to control memory management. Thus, many browser vulnerabilities involve garbage collector memory management (e.g., use-after-free exploits). For example, a malicious code may try to exploit a use-after-free vulnerability in an Orinoco garbage collector for a browser (e.g., Chrome) by creating a special object that will be freed under particular conditions by the garbage collector. The object may be later accessed by the malicious code to trigger the vulnerability. Using the disclosed method, this scenario may not execute, because as each API tries to create any object, it may be intercepted and executed in a chaotic manner, with the reference held by the software agent mapping function. The malicious code may not be able to trigger the vulnerability, because the reference to the object is still held, rather than freed, and the garbage collector will not collect it.

In some embodiments, the disclosed method may be performed in real time without disrupting or impacting performance. Only minimal latency may be introduced in the execution of the code and/or other programs executing on the computer system, in a manner that is undiscoverable by the attacker.

In some embodiments, the disclosed method may not require malicious code detection to operate. The technique is performed without regard to the received content being suspicious or not, and without the need for applying malware detection algorithms.

In one embodiment, the disclosed technique may be useful for restricted devices, since it operates on the application level without the need to gain access to the OS.

Malicious code or malicious content, as these terms are used throughout this disclosure, may refer to any content, code, or computer program instructions intended for a malicious purpose, such as exploit code. Malicious code may be configured to perform any surreptitious or malicious task, in a way that is unwanted and unknown to a user, such as to take control of a computer, obtain data from a computer, and the like.

In some embodiments, the disclosed methods may be implemented with respect to any content included in a file or any other received content, without regard to whether the content itself is deemed suspicious in advance of performing the disclosed method.

In some embodiments, however, one or more malware detection techniques may be implemented in association with received content. A modified received content may be generated, but knowledge or awareness of suspected malicious or suspicious content may not be required to disarm malicious content included in the received content.

Received content, according to the disclosed embodiments, may include any form of electronic content, including files or other objects that may be downloaded, run, processed, opened, or executed by an application or operating system of the victim computer or computing device. Malicious content may be embedded in seemingly legitimate content. A file according to the disclosed embodiments may include any file or file-like content, such as an embedded object or script, that is processed, run, opened, or executed by an application of a computing system. In some embodiments, the present disclosure may provide a chaotic execution environment generating engine configured to run within an interpreter based environment.

A system is also described for employing the method described herein. The system may include one or more processing units (e.g., processors) and a memory coupled thereto. The memory may store program code for execution by the one or more processing units. The program code may include an interpreter-based cyber security agent (IBCA), which may include several modules: a patcher configured to patch exposed native APIs of current execution context, and a controller configured to intercept API invocation of the wrapped APIs. The program code may further identify API invocations that are used for backing store allocation, manipulations of user-controlled input, and/or manipulation of the environment state. The program code may further refer the API invocation to a chaotic engine configured to manipulate the altering invocation, such as by splitting and rearranging the invocation into subsets, encoding, identifying the types of arguments, padding and diverting the manipulated invocation to multiple different contexts.

The controller may be further configured to store a mapping between the original and manipulated object and to generate values to be returned to the original invocation, using the mapping. This may ensure that complete functionality for the high-level code is maintained; while code that relies on a predictable behavior of the environment state may fail to fulfill any malicious intent.

Reference is now made to FIG. 1 which depicts components of a system 100, in accordance with some embodiments, that inhibit (e.g., prevent) exploitations and neutralizes the execution of malicious code associated with a computing process executing thereon.

System 100 includes at least one processor 102, at least one secondary storage device 104, network hardware 106, memory 110, and communication infrastructure 108 interconnecting any or all the above. In some embodiments, network hardware 106 may be part of communication infrastructure 108.

A memory, such as memory 110, may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. A memory may include one or more separate storage devices collocated or disbursed, capable of storing data structures, instructions, or any other data. A memory may further include a memory portion containing instructions for the processor to execute. A memory may also be used as a working scratch pad for the processors or as a temporary storage. Secondary storage device 104 may include one or more memories 110, as well as other components for facilitating access to a memory 110, such as a communication infrastructure and/or processor.

Some embodiments may involve at least one processor, such as processor 102, consistent with the previously presented processor description for performing logic operations. The instructions executed by at least one processor may, for example, be pre-loaded into a memory integrated with or embedded into the controller or may be stored in a separate memory.

In some embodiments, system 100 may include communication infrastructure 108, which may include a bus and/or a network. A bus may be any communications connection between components, such as memory 110 and processor 102, which may exist on a single device (e.g., a processing device). A network may constitute any type of physical or wireless computer networking arrangement used to exchange data. For example, a network may be the Internet, a private data network, a virtual private network using a public network, a Wi-Fi network, a local area network (LAN) or wide area network (WAN), and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

In some embodiments, a combination of components shown in system 100 may be part of a device (e.g., a computing device) capable of carrying out steps, operations, processes, methods, and/or aspects discussed below. For example, device 8-102, discussed further below, may include a processor 102, communication infrastructure 108, and/or a memory 110.

System 100 may store in a non-volatile memory thereof, such as memory 110 or another storage device, program instructions or components configured to operate processor 102. In some embodiments, the software components may include an operating system, including various software components and/or drivers for controlling and managing general system tasks (e.g., memory management, storage device control, power management, etc.) and for facilitating communication between various hardware and software components. The program instructions may include one or more software modules, such as JavaScript Agent (JSA) 146 and/or initializer 150. As discussed herein, the term JSA is to be understood as an exemplary implementation of an interpreter-based cybersecurity agent (IBCA). Thus, the techniques described herein below are not limited to JavaScript enabled applications and may be applied within additional interpreter-based platforms, and thus may be compatible with one or more of HTML, CSS, JavaScript, PHP, Python, Perl, Ruby, SQL, Matlab, Lisp, SmallTalk, and Scala interpretive languages.

Memory 110 may be segmented into user space 112 and kernel space 114. Kernel space 114 may be reserved for storing and running operating system 116, and user space 112 may store and run application processes, such as browser process 120.

When a request is made by a browser for a web page, the request may be transferred from the browser to the network stack 140, to network hardware driver 118, to network hardware 106, and the transferred to world-wide web 144, reaching target web server 142. The web page may include an external executable JavaScript code (input code). The web page may be received by the browser via network stack 140 and a browser process 120 initiated by the browser, which may include a number of components, such as browser components 124 (e.g., applications, modules, functions, services, or any portion of code associated with a browser).

JavaScript engine 130 may then initiate an execution context 132. The web page may be rendered (e.g., as rendered web page 122) by different elements of the browser engine (e.g., HTML parser 126, CSS parser 128). The JavaScript code may be referred for execution by the JavaScript engine 130 (for example, V8 in chrome). The JavaScript Engine native APIs 134 may be invoked by a given input code with arguments for generating a new Array. A native array constructor may be invoked, and a new array may be created and filled with provided arguments in a predictable manner.

JavaScript engine 130 may then generates a corresponding backing store array object (e.g., jsArray) 138, such as within process memory 136 and may initialize backing store array object 138 with the supplied arguments.

The API invocation may return the newly generated array object with the initialized arguments. This predictable behavior means that the array holds its corresponding backing store object 138 (e.g., a jsArray object), with a predictable offset between the nodes, and/or has predictable properties such as length and/or type. This may enable an exploit process to generate an array for holding shellcode payload before execution, and thus carry out its malicious intent without any hinderance.

To inhibit (e.g., prevent) the exploit process from executing as intended, embodiments are described herein for manipulation certain aspects of JavaScript engine 130 during run time. For example, a received web page may be first encountered by initializer 150. Initializer 150, which may be configured to perform one of more of the following tasks:

Detect the current JavaScript environment (e.g., a browser, another application, a Node.js application, electron application, QuickJS, etc.);

detect the source of the current context, prepare artifacts, such as random internal nested execution contexts (iframes), start the Document Object Model (DOM) monitoring logic, and/or initiate the JavaScript Agent (JSA) 146 context logic.

In some embodiments, the received code may be then injected, upon or prior to its receipt by the browser, with JavaScript Agent (JSA) 146. Such interception and injection may be carried out by a proxy 148 connected to network 106. JSA 146 may be injected at the top of a page/received code, so that JSA 146 is executed first by the JavaScript engine. JSA 146 may be configured to identify and patch all native APIs exposed by the current execution environment, before any code is executed. Following the patching, JSA 146 may also be configured to intercept all API invocations and identify all API invocations associated with input data that may result in manipulation of a backing store object. JSA 146 may also be configured to further modify the altered APIs in a chaotic manner, so that the effect of API invocation on the memory layout will be unpredictable.

JSA 146 may be configured to save the new arrangements in a mapping and may use the mapping to retrieve the original values. Thus, legitimate JavaScript code will work as intended, while any malicious code relying on predictable behavior of process memory layout, may fail to fulfill its malicious intent.

System 100 as described herein is only an exemplary embodiment, and in practice may be implemented in hardware only, software only, or a combination of both hardware and software. System 100 may have more or fewer components and modules than shown, may combine two or more of the components, or may have a different configuration or arrangement of the components. System 100 may include additional components for functioning as an operable computer system, such as a motherboard, data busses, a power supply, a network interface card, etc. (not shown). Moreover, components of system 100 may be co-located or distributed and configured to run as one or more cloud computing "instances," "containers," "virtual machines," or other types of encapsulated software applications known in the art.

Figure 2:
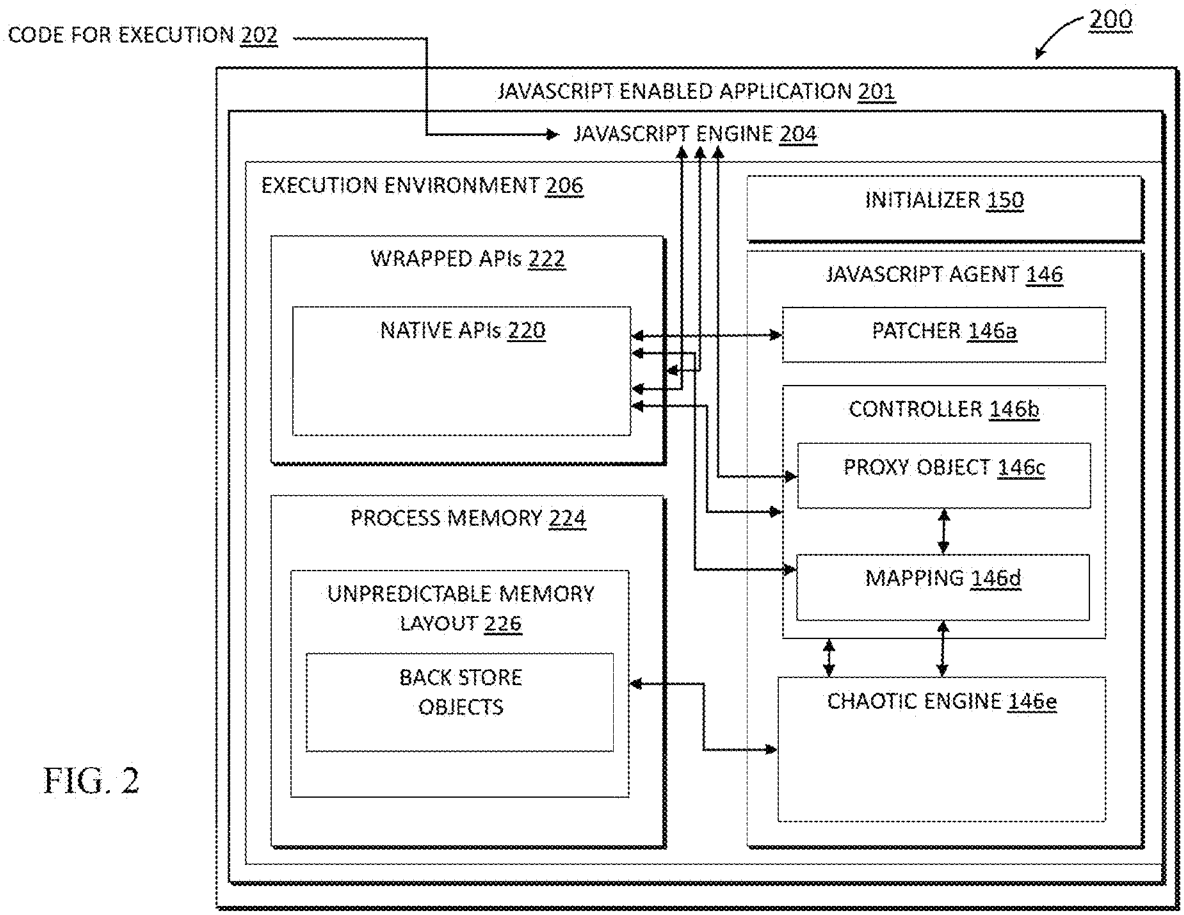
FIG. 2 is a block diagram of system for patching native APIs and intercepting and manipulating of patched APIs invocations, consistent with some embodiments of the present disclosure.

Reference is now made to FIG. 2, which is a block diagram of an exemplary execution environment 200 for patching of native APIs and interception and manipulation of patched API invocations, constructed and operative in accordance with disclosed embodiments. An application 201 capable of JavaScript execution (e.g., a JavaScript enabled application) receives code 202 (e.g., input code) for execution, which may contain or indicate input data (discussed below). In some embodiments, JSA 146 may be injected into the top of received code 202 (e.g., a received web page) upon or prior to the receipt of code 202 by the browser. Code 202 may be directed to JavaScript Engine 204 for execution. Within execution environment 206, JavaScript Engine 204 may first execute JavaScript agent (JSA) 146.

Such interception and injection may be carried out by a proxy 148, connected to network 106, as shown in FIG. 1. In some embodiments, JSA 146 may be injected at the top of the page/received code 202, so that it will be executed first by the JavaScript engine.

In some embodiments, JSA 146 may identify and patch native APIs exposed by the current execution environment, before other code is executed. Thus, in some embodiments, a component, such as a patcher **146*a*, a module of JSA 146, may identify and patch exposed native APIs 220 in the current execution context, before other code is executed. Thus, from this point onward, interactions between the received code and the native APIs may be mediated by JSA 146. In some embodiments, an API invocation may see the wrapped APIs 222. Thus, API calls invoked by code 202 may be intercepted by wrapped APIs 222 and may be referred to a controller 146*b*. In some embodiments, controller 146*b* may be invoked on each invocation of a native API, causing replacement of the native API with the wrapped API. Based on the invocation type, controller 146*b*** may perform at least one of the following actions:

Serialize invocation parameters for telemetry, invoke the execution control module, and/or transfer control to chaotic engine **146*e***, to perform manipulations, as further detailed below.

In some embodiments, patcher **146*a* may be invoked for multiple execution contexts, such as every execution context (e.g., iframe) within the execution environment. Thus, patcher 146*a*** may be invoked within the "top" context, as well as within any other nested execution context.

In some embodiments, patcher **146*a*** may be applied within at least one of the two following two main categories:

Regular native functions, which may also return a new object instance, and/or

Native constructor functions, which, when called using "new," will create a new object instance.

In some embodiments, patcher **146*a* may be invoked for multiple execution contexts, such as every execution context, including any "top" execution context as well as any execution context nested therein. In some embodiments, when the "top" and nested execution context are of the same source, patcher 146*a* may patch the nested execution context window objects within the same JSA execution context, i.e., without the need for re-executing the JSA in the nested execution context. However, in cases where the nested execution context is from a different source, e.g., "cross origin," initializer 150** may re-inject the JSA in the nested execution context.

In some embodiments, patcher **146*a* may iterate on some of the native exposed APIs. Patcher 146*a* may replace the original native APIs with the wrapped APIs, where the wrapped APIs may invoke controller 146*b*** on each invocation.

In some embodiments, patcher **146*a*** may operate within two main categories:

Regular native functions, which may also return a new object instance, and/or native constructor functions, which, when called using "new," will create a new object instance.

In some embodiments, the disclosure provides for manipulations to ensure that the wrapped APIs may not be detected, while maintaining full functionality. For example, some embodiments may include storing, for at least one wrapped API, the at least one wrapped API as the key and the original native API as the value in a special key-value mapping **146*d***. This may facilitate locating a native API based on the wrapped API and may allow returning the expected values for operations on the wrapped API, as explained below. For example:

* someFunc.toString( ) should return the string representation of a function, and in the case of a native function, it will return—"function Array( ) {[native code]}" (for Array native).

someFunc.length indicates the number of parameters expected by the function.

someFunc.name—indicates the function name as specified when it was created.

These functions should return the expected value for each wrapped API, such that with respect to each invocation, the original native API may be retrieved via the mapping **146*d***. The corresponding value for the native API may be returned as the expected value. Thus, functionality transparency may be maintained for each of the wrapped APIs.

In some embodiments, following the patching, JSA 146 may intercept API invocations and identify API invocations associated with input data that may result in manipulation of a backing store object. A component, such as controller **146*b*, a module of JSA 146, may divert API calls associated with input data and resulting in manipulation of a backing store object, to a chaotic engine 146*e*. Chaotic engine 146*e* may manipulate the input data, and may split it into different contexts when building the backing store objects. This may result in an unpredictable memory layout 226, which may be part of process memory 224 (e.g., memory storing data related to one or more processes related to JavaScript engine 204**).

A mapping **146*d* of the manipulations applied to the API calls may be generated and stored at controller 146*b*. Mapping 146*d* may map between the original and manipulated execution parameters. In some embodiments, a proxy object 146*c* may be created, which may be returned to the original code invocation. In some embodiments, code may see the proxy-object as an array. Calls to indexes of the proxy object may reach controller 146*b*, which may return expected values to read operations, by using mapping 146*d***. Attempts to add nodes to the array may also result in referring the call to the chaotic engine for manipulation.

Thus, complete functionality for the high-level code may be maintained, as the proxy object may return the expected values for read operations. However, code that relies on the predictable behavior of the underlying memory may fail due to the manipulations used by the process of generating the backing store objects.

Non-altering API invocations, e.g., API calls that are not used for back storing allocation and/or manipulation of user-controlled input, are documented and transferred to the native API (e.g., by the controller **146*b*). In some embodiments, the controller 146*b*** may be configured to block such API calls, based on, e.g., an enterprise policy, any computerized rule, or any combination thereof.

The program instructions of JSA 146, shown in FIGS. 1 and 2, including its modules patcher **146*a*, controller 146*b*, proxy object 146*c*, mapping 146*d* and chaotic engine 146*e*, will now be discussed with reference to the flowchart of FIG. 3**, which illustrates steps in a method for exploitation prevention and malicious process protection in a computer system, in accordance with some disclosed embodiments.

Figure 3:
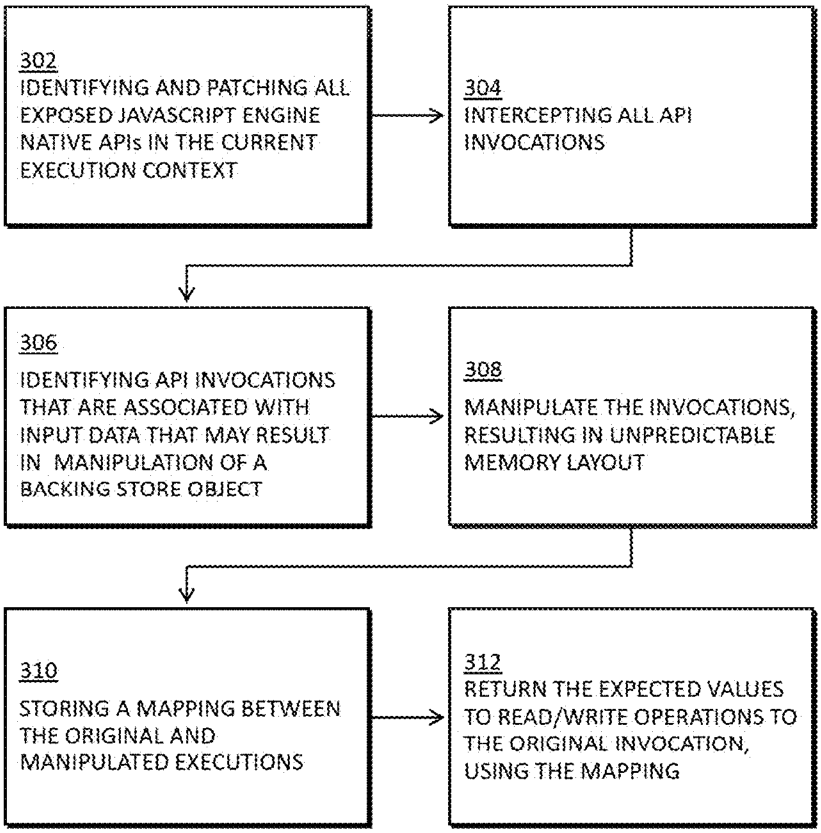
FIG. 3 depicts a flowchart of an exemplary method for protecting a computer system from vulnerabilities exploitations and/or malicious processes, consistent with some embodiments of the present disclosure.

For illustrative purposes, the flowchart in FIG. 3 is described with continued reference to system 100 in FIG. 1, and execution environment 200 in FIG. 2.

JavaScript Agent (JSA) 146, of FIGS. 1 and 2, respectively, may operate according to the flowchart in FIG. 3. The different modules of JSA 146 shown in FIG. 2, e.g., patcher **146*a*, controller 146*b*, proxy object 146*c*, mapping 146*d* and chaotic engine 146*e*, may operate according to the flowchart in FIG. 3. In some embodiments, wrapped APIs 222 and unpredictable memory layout 226, in FIG. 2, may operate according to the flowchart in FIG. 3**.

In some embodiments, in step 302, a received code may be executed by application 201, e.g., a received webpage may be rendered in a browser.

In some embodiments, exposed native APIs in the current execution context may be identified and patched. For example, with reference to FIG. 2, a program instruction of system 100 may cause a component, such as patcher **146*a*, a module of JSA 146, to carry out identification and patching of exposed native APIs. In some embodiments, for example at the conclusion of step 302, exposed native APIs 220 may become wrapped APIs 222, and may be linked to controller 146*b***.

In some embodiments, for example at step 304, a program instruction of system 100 may cause a component, such as controller **146*b*, a module of JSA 146, to intercept all API invocations, which may be now patched to wrapped APIs 222**.

In some embodiments, a component, such as controller **146*b*, may be configured to intercept invocations of a native API (e.g., each invocation of a native API), and to replace an intercepted invocation of a native API with wrapped APIs 222**.

For example, in FIG. 2, invocations of wrapped APIs 222 may be intercepted and referred to a component, such as controller **146*b*. In some embodiments, a component, such as controller 146*b* may be configured to intercept API invocations. In some embodiments, controller 146*b* may be configured to intercept only API invocations which include input data or values, e.g., array arguments, from an untrusted source. In some embodiments, intercepted API invocations are only those including 'exposed' APIs (e.g., those APIs which may result in a backing store allocation). In some embodiments, 'exposed' APIs may be detected by JSA 146** in real time, during execution. Additionally or alternatively, exposed APIs may be detected based on a predetermined list of APIs. Examples of such APIs are any APIs which may be used for storing and/or manipulating input arguments from a third-party, which may include, but are not limited to, Array( ) constructor, Object constructors, typed arrays, Array Buffer, collections, Atomics, or DataView.

In some embodiments, for example at step 306, the intercepted API invocations that are associated with input data that may result in manipulation of a backing store object may be identified and referred for manipulation. For example, with reference to FIG. 2, a program instruction of system 100 may cause a component, such as controller **146*b***, to perform the identification and referral.

In some embodiments, for example at step 308, a program instruction of system 100 may cause a component, such as chaotic engine **146*e* of JSA 146**, to perform chaotic manipulation of a referred API invocation. In some embodiments, such manipulation may include any combination of one or more of the following:

- Splitting of arguments into subsets, and rearranging the split arguments in different argument subsets;
- encoding input arguments or argument subsets with, e.g., a runtime generated key unique for each API invocation. In some cases, a different encryption key may be generated for each argument;
- inserting random padding of the same type as the argument in one or more of the arguments or argument subsets; and/or
- diverting of manipulated data to multiple different execution contexts.

For example, with reference to FIG. 2, manipulation may be performed by chaotic engine **146*e* of JSA 146**. In some embodiments, chaotic execution may include a random selection and/or combination of any of the above-listed actions, e.g., splitting, encoding, padding, and/or diverting into different execution contexts.

In some embodiments, any or all of the above-mentioned manipulation methods may be performed in a random manner. For example, splitting arguments into subsets may be done randomly, whereas the number of subsets and their lengths selected by JSA 146, e.g., by chaotic engine 146*e*, at random. In another example, the above steps of splitting to argument subsets, padding, and diverting into different execution contexts may be performed by chaotic engine 146*e*, e.g., at random.

An exemplary implementation of a chaotic execution of array object creation and execution in a chaotic environment is now described. However, array objects are one example of objects that may be created and/or utilized by API invocations and may result is backing store allocation. Other, additional, and/or similar objects and their associated API invocation and/or other service calls may be similarly executed within a chaotic execution environment, resulting in unpredictable and/or unknowable layout of the process memory.

Figure 4A:
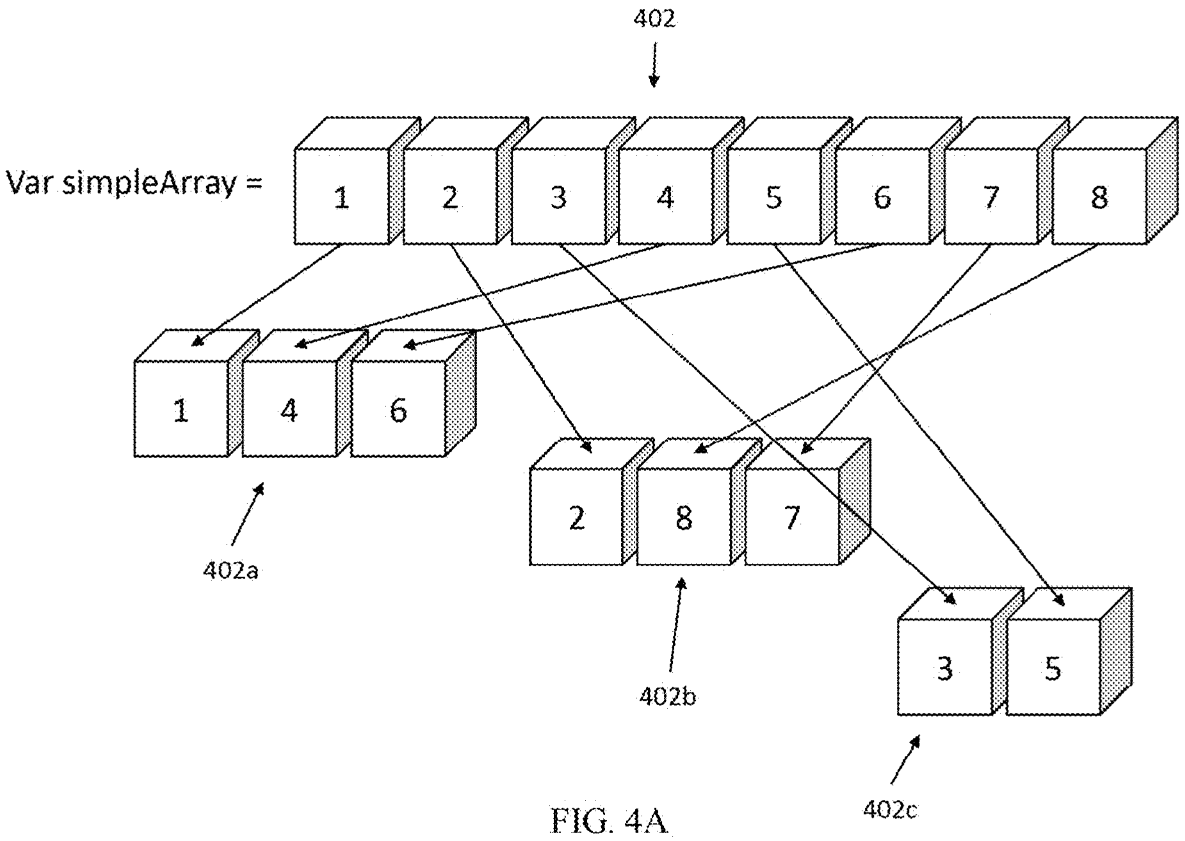

FIG. 4A is a schematic illustration of an object creation process. In the example shown, a new variable is declared using the declaration Var and assigning to it an array 402 including the arguments 1, 2, 3, 4, 5, 6, 7, 8, using the simpleArray method. This formulation may invoke the native array creator API which will attempt to create the array with the supplied arguments. The array creation may result in a backing store allocation by the interpreter of memory addresses to store the created array.

In some embodiments, the input argument may be divided or split into a plurality of splits or subsets. In some embodiments, the number of splits may be randomly selected by JSA 146, e.g., by chaotic engine 146*e*. In some embodiments, the split may be performed in a random and arbitrary manner, wherein the number of subsets and their length may be selected by JSA 146 e.g., by chaotic engine 146*e*, at random.

As can be seen in FIG. 4A, the arguments are split into 3 exemplary subsets 402*a*, 402*b*, and 402*c:*

Subset 1: 1, 4, 6.

Subset 2: 2, 8, 7.

Subset 3: 3, 5.

Figure 4B:
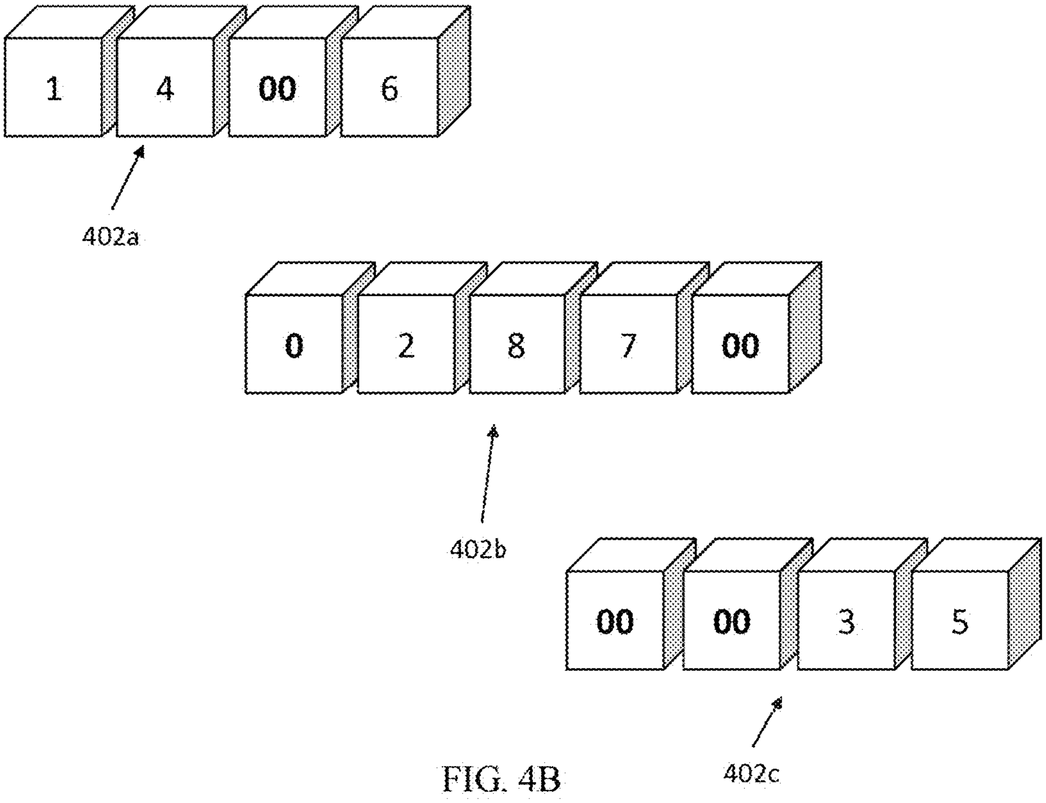

In some embodiments, JSA 146, e.g., chaotic engine 146*e*, may further perform one or more of the following with respect to one or more for the splits:

- Encoding one or more of the subsets 402*a*-402*c* using hashing or encryption;
- determining the argument type (e.g., integer, string); and/or
- padding the data in one or more of subsets 402*a*-402*c* with random data of the same type (FIG. 4B). The type, size, and placing of the padding data may be selected randomly by JSA 146, e.g., by chaotic engine 146.

FIG. 4B describes an exemplary implementation for padding the data stored in subsets 402*a*-402*c* of FIG. 4A such as with random data of the same type. The padding may be performed after determining the argument type (e.g., integer, string, character). Thus, in subset 402*a*, the string 00 may be inserted. Similarly, in subset 402*b*, the strings 0 and 00 may be inserted, and in subset 402*c*, the strings 00 and 00 may be inserted.

Figure 4C:
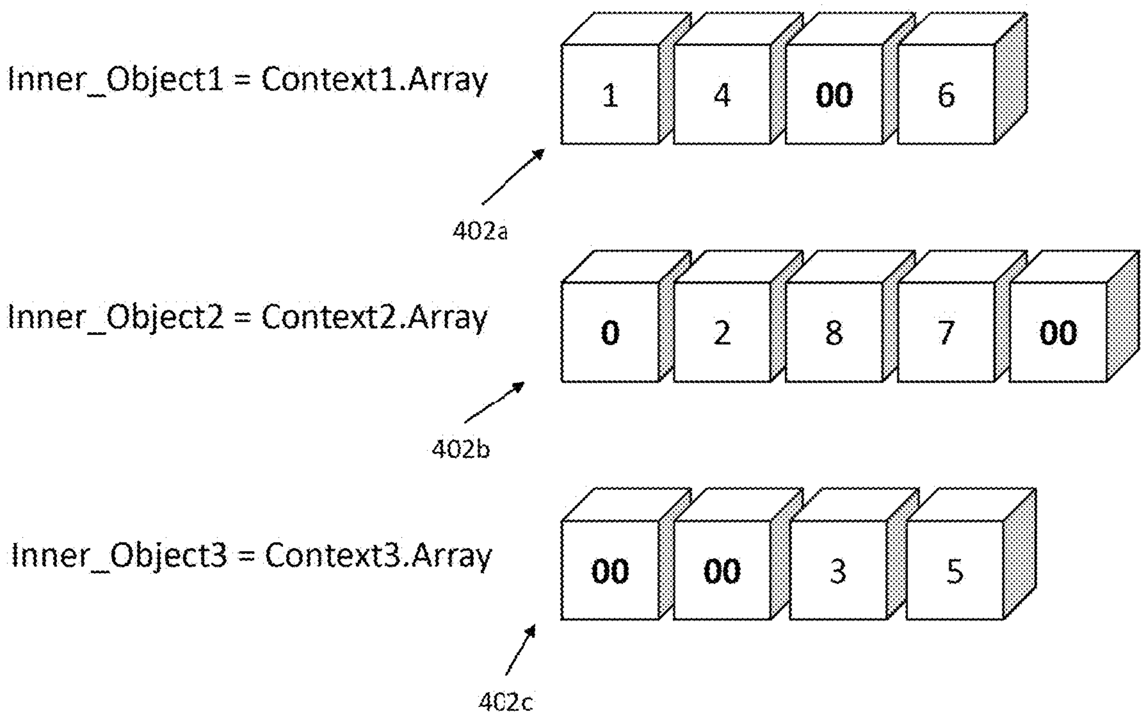

FIG. 4C describes an exemplary implementation for generating separate execution contexts for each of the split subsets 402*a*-402*c* of FIGS. 4A-4B. With reference to FIG. 4C, a software agent (e.g., JSA 146) may create a new array based on each subset 402*a*-402*c* in each execution context. Thus, the chaotic execution environment results in creating 3 arrays (Context1.Array, Context2.Array, and Context3.Array), each in a separate context.

In some embodiments, in the case of a web browser, JSA 146, e.g., chaotic engine 146*e*, may generate different inline frames (iframes) for different contexts. In some embodiments, an execution context may be understood as (e.g., be represented by) a wrapper object, which may hold details for processing a given method, such as variable object, window object, event queue, scope chain, or other browser element. Forcing a web browser to create new iframes may generate a new execution context for one or more of (e.g., each of) split subsets 402*a*-402*c*.

With reference to FIG. 3, in some embodiments, for example at step 310, a program instruction of system 100 may cause a component, such as JSA 146, to generate and/or store a mapping 146*d* of the associations between subsets 402*a*-402*c* and different memory locations and execution contexts. Mapping 146*d* may be generated and/or stored to map between the original and manipulated objects. For example, in FIG. 2, such mapping 146*d* may be generated and stored by chaotic engine 146*e* at controller 146*b*. In some embodiments, the mapping may include a location of each of the subsets of arguments within multiple arrays. In some embodiments, the mapping may store information with respect to any chaotic execution action and/or manipulation performed with respect to an intercepted API, e.g., splitting, encoding, padding, or diverting.

For example, with reference to FIG. 4C, an exemplary location mapping 146*d* may include at least one of the following elements:

- The location of the argument with index 0 (value=1) created in array 402 in FIG. 4A may be designated as argument index 0 within Inner_Object1: simpleArray[0]→(Inner_Object11[0])
- The location of the argument with index 4 (value=5) created in array 402 may be designated as argument index 3 within Inner_Object3: simpleArray[4]→(Inner_Object3[3])

Referring to FIG. 4D, an exemplary mapping 146*d* is shown. Mapping 146*d* may be used (e.g., in step 312), detailed below, to return the expected values of read operations. Expected values may be returned with respect to read and/or write operations using mapping 146*d*, such that legitimate code may execute as intended. Thus, for example, an API call to read data from the supposedly created array 402 at index 4 may be intercepted by JSA 146. JSA 146 may retrieve the relevant value using the mapping 146*d*. However, the actual simple array 402 does not exist, thus any attempt to use it by the malicious code is frustrated.

In some embodiments, mapping 146*d* may be configured to maintain functionality of the execution environment, in view of the various chaotic manipulation applied to the executed code. For example, for each patched function, mapping 146*d* may store in a key-value map the patched function as the key, and the original native as the value. Thus, mapping 146*d* can enable to efficiently locate the native implementation based on the patching and return the expected values for operations on the patched function. For example:

- The function someFunc.toString( ) should return the string representation of a function, and in the case of a native function, it will return "function Array( ) {[native code]}" (for Array native).
- The function someFunc.length indicates the number of parameters expected by the function.
- The function someFunc.name indicates the function's name as specified when it was created.

With reference back to FIG. 3, in some embodiments, for example at step 312, the expected values of read and/or write operations may be returned to the original invocation, e.g., using the mapping. Thus, legitimate code may be executed as intended, while code that relies on the predictable behavior of the underlying memory may fail to fulfill its malicious intent.

In some embodiments, a proxy object may be generated and/or returned to the invocation, so that a simple array variable holds this array, and read operations may be intercepted by the proxy object. The proxy object may use the mapping to retrieve the proper value, decode it, and return it to the original invocation. The proxy object described here is an example of proxy object 146*c* in FIG. 2. For example, with reference to FIG. 2, proxy object 146*c* may be created by chaotic engine 146*e*, and proxy object 146*c* may be linked to mapping 146*d*.

Figure 7:
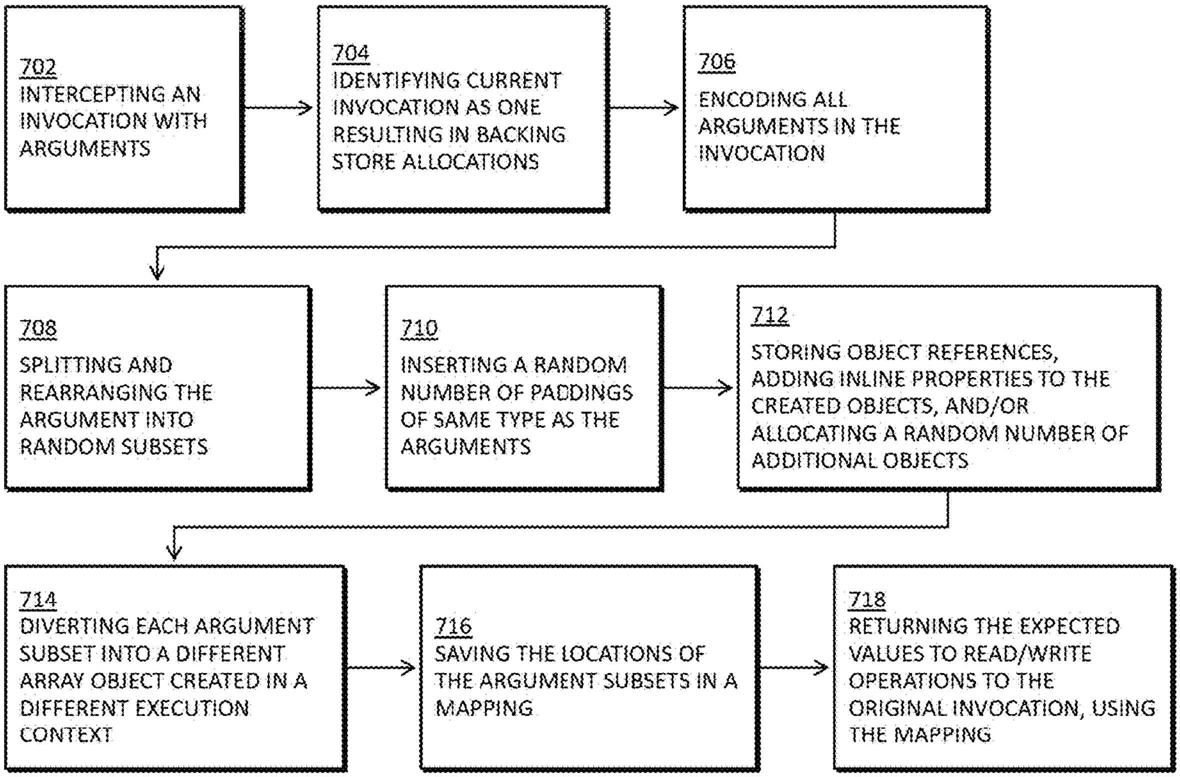
FIG. 7 depicts a flowchart of an exemplary method for manipulating input data and splitting context, consistent with some embodiments of the present disclosure.

The program instructions of JSA 146, shown in FIGS. 1 and 2, including its modules patcher 146*a*, controller 146*b*, proxy object 146*c*, mapping 146*d* and chaotic engine 146*e*, will now be discussed with reference to the flowchart of FIG. 7, which illustrates steps in a method for manipulating input data and splitting context in accordance with some embodiments of the present disclosure.

In some embodiments, for example at step 702, when an API invocation for simpleArray creation is intercepted, such interception may be performed by wrapped API 222 (FIG. 2), as related to step 304 of FIG. 3.

In step 704, the invocation may be identified as altering, i.e., the invocation results in backing store allocation. The identification may be performed by controller 146*b* of FIG. 2 as related to step 306 of FIG. 3.

In step 706, the arguments of the invocations may be encoded.

In step 708, the arguments may be split and rearranged into a few groups. Such splitting and/or rearrangement may be performed by chaotic engine 146*e* (FIG. 2), as related to step 308 of FIG. 3, and to subsets 402*a*-402*c* of FIG. 4A.

In step 710, the argument type may be checked, and random padding of the same type may be inserted between each argument. The padding may be performed by chaotic engine 146*e* (FIG. 2), as related to step 308 of FIG. 3 and to FIG. 4B.

In step 712, object references may be stored by JSA 146, such that the reference to that object may not be freed and a garbage collector may not collect it. In some embodiments, JSA 146 may also add at least one inline property to the created object, for example, by adding a random number of properties containing primitive values and setting them as non-enumerable with a Symbol as the property key.

In step 714, an argument group (e.g., each argument group) may be diverted into different array objects generated in different contexts. Such diversion to different contexts may be performed by chaotic engine 146*e* of FIG. 2 as related to step 308 of FIG. 3 and to FIG. 4C.

In step 716, the new argument location (index and array object) may be stored in a mapping, such as mapping 146*d* of FIG. 2 and described in FIG. 4D. The mapping may be performed by chaotic engine 146*e* of FIG. 2.

In step 718, the expected values with respect to read and/or write operations may be returned to the original invocation, e.g., using the mapping. Thus, legitimate code may be executed as intended, while any code that relies on the predictable behavior of the underlying memory may fail to fulfill its malicious intent.

In some embodiments, a proxy object may be generated. The proxy object may be returned to the invocation, so that a simple array variable holds the array, and read operations may be intercepted by the proxy object. The proxy object may use the mapping to retrieve the proper value, decode it, and return to the original invocation, for example proxy object 146*c* (FIG. 2) as described in step 312 of FIG. 3.

Some embodiments may include a device, computer readable medium at least one processor for performing cybersecurity operations configured to receive, by an application capable of interpreter-based execution, code for execution. An application capable of interpreter-based execution may include a computer program configured to directly execute, parse, analyze, change, and/or simulate instructions written in an interpretive language without requiring advance compilation into machine code. Examples of interpretive languages may include scripting languages, such as JavaScript, Perl, Python, Ruby, Smalltalk, and Matlab, and other languages that do not require compilation before execution. The application capable of interpreter-based execution may parse an interpreted language instruction and perform its behavior directly, translate an interpreted language instruction into an intermediate language for immediate execution, and/or match the interpreted language instruction to one or more pre-stored machine code instructions for immediate execution. Before executing the code, the system may execute an intercepting code. As discussed below, an intercepting code may include at least one of an algorithm, a wrapper, an agent, a pointer, a call, a memory location, a function, a command, a module, a frame, an argument, at least one line of code, an object, a reference, or any other computing language configured to influence input code (e.g., by causing the input code to exhibit non-native functionality, as discussed herein). The intercepting code may be configured to intercept at least one application programming interface (API) invocation by the code. The system may intercept, via the intercepting code, an API invocation by the executed code, and determine that the intercepted API invocation results in (e.g., causes) a manipulation of the environment state. The system may modify an execution of the intercepted API invocation, where the modified execution results in a non-predictable environment state, consistent with disclosed embodiments. As discussed above, a non-predictable environment state may include one or more runtime parameters that are configured to cause unexpected runtime behavior and/or results for a given input (e.g., an unpredictable memory layout 226).

Some embodiments may involve storing a mapping of the modified execution and using the mapping to respond to read or write operations by the intercepted API.

In some embodiments, the application may be a JavaScript engine, and the received code may be JavaScript code.

In some embodiments, modifying may include performing at least one of:

(i) encoding at least some randomly selected arguments in input data associated with the API invocation;

(ii) dividing the input data into a random number of execution contexts;

(iii) splitting the input data into a random number of subsets of the input data;

(iv) padding at least some randomly selected arguments in the input data with random data of the same type;

(v) adding a random number of inline properties to the input data, where the properties are as non-enumerable with a Symbol as the property key;

(vi) allocating a random number of additional backing store objects;

(vii) Storing the allocated object in an internal map;

(viii) Adding random latency for specific invocations;
(ix) Manipulating classes prototypes on specific conditions;
(x) Shadowing specific objects on context exit;
(xi) Deoptimization on dramatic mutation; and/or
(xii) Forced side effects on dramatic mutation.

In some embodiments, the intercepted API invocation may include creating a new object, where the dividing may include at least one of:

(i) splitting the input data into a random number of subsets of the input data; and/or
(ii) creating, for each of the subsets, a separate object within one of the different execution contexts.

In some embodiments, the intercepted API invocation may include creating a new array object, where the input data may include arguments associated with the array object, and where the dividing may include at least one of:

(i) splitting the input data into a random number of subsets of the input data; and/or
(ii) creating, for each of the subsets, a separate array object within one of the different execution context.

In some embodiments, the mapping may include a location of each of the arguments within the different execution contexts. In some embodiments, the intercepting may include intercepting API invocations from all available execution contexts (e.g., present in input code or input data) associated with the execution. Of course, the intercepting may include intercepting API invocations from a subset of all available execution contexts associated with the execution. In some embodiments, the mapping may include a reference to a location of each of the objects, where the reference is freed upon the occurrence of a specified condition. In some embodiments, responding may be performed by a proxy object.

Some embodiments may provide a system including at least one hardware processor; and a non-transitory computer-readable storage medium having stored thereon program instructions, the program instructions executable by the at least one hardware processor to: receive, by an application capable of JavaScript execution, a code for execution, inject, before the execution, an intercepting code into the received code, wherein the intercepting code is configured to intercept all application programming interface (API) invocations by the received code, intercept, by the intercepting code, an API invocation by the received code, determine that the intercepted API invocation, and results in a manipulation of a backing store object, and modify an execution of the intercepted API invocation, wherein the modified execution results in a non-predictable memory layout.

In some embodiments, the program instructions are further executable to store a mapping of the modified execution, and use the mapping to respond to read or write operations by the intercepted API.

In some embodiments, the injecting is performed by at least one of: a proxy server, a browser extension, and a privileged operating system agent.

In some embodiments, the application is a web browser, and the received code is a webpage.

In some embodiments, modifying may include at least one of:

(i) encoding at least some randomly selected arguments in input data associated with the API invocation;
(ii) dividing the input data into a random number of execution contexts;
(iii) splitting the input data into a random number of subsets of the input data;
(iv) padding at least some randomly selected arguments in the input data with random data of the same type;
(v) adding a random number of inline properties to the input data, wherein the properties are as non-enumerable with a Symbol as the property key; and
(vi) allocating a random number of additional backing store objects.

In some embodiments, at least some of the execution contexts are inline frames.

In some embodiments, the intercepted API invocation includes creating a new JavaScript object, and wherein the dividing includes: (i) splitting the input data into a random number of subsets of the input data; and (ii) creating, for each of the subsets, a separate the object within one of the different execution contexts.

In some embodiments, the intercepted API invocation includes creating a new array object, wherein the input data includes arguments associated with the array object, and wherein the dividing includes: splitting the input data into a random number of subsets of the input data; and creating, for each of the subsets, a separate array object within one of the different execution context.

In some embodiments, the mapping includes a location of each of the arguments within the different execution contexts.

In some embodiments, the intercepting includes intercepting API invocations from all available execution contexts associated with the execution.

In some embodiments, the mapping includes a reference to a location of each of the objects, and wherein the reference is freed upon the occurrence of a specified condition.

In some embodiments, the responding is performed by a proxy object.

Disclosed embodiments may involve cybersecurity operations. A cybersecurity operation includes one or more actions designed to impede, thwart, or at least partially avoid unauthorized activities in a computer system or network. Such unauthorized activities may involve attempts to exploit a computer system or network, to gain unauthorized access, and/or to conduct malicious activities. Cybersecurity operations described herein may impede, thwart or at least partially avoid such conduct through the practice of methods, or operations implemented through at least one processor and/or through computer readable medium such as software code. Such operations may be carried out in a computer system and/or via a network.

Figures 1, 8:
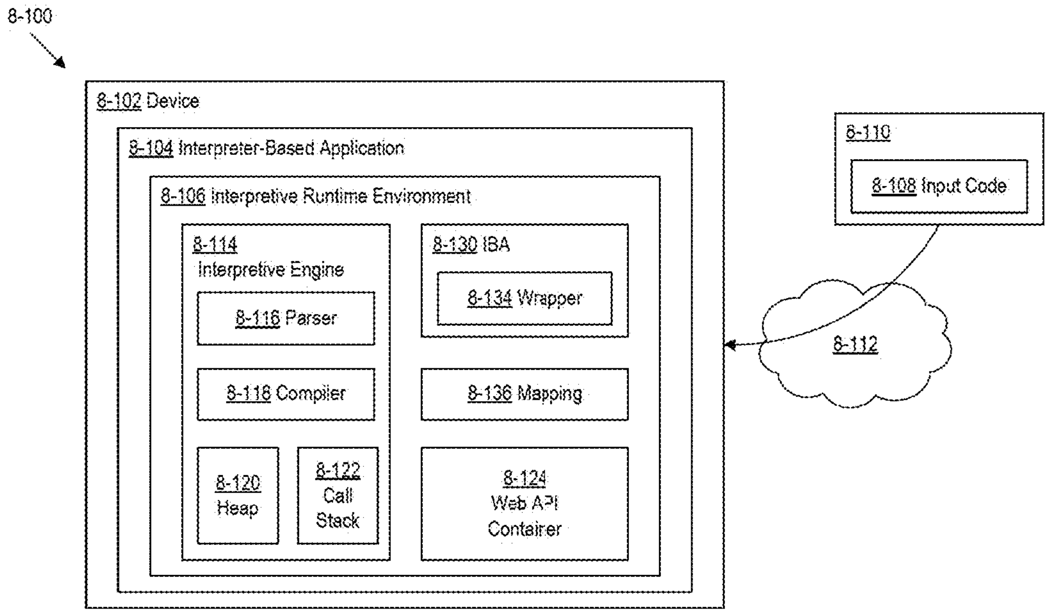
Figures 2, 8:
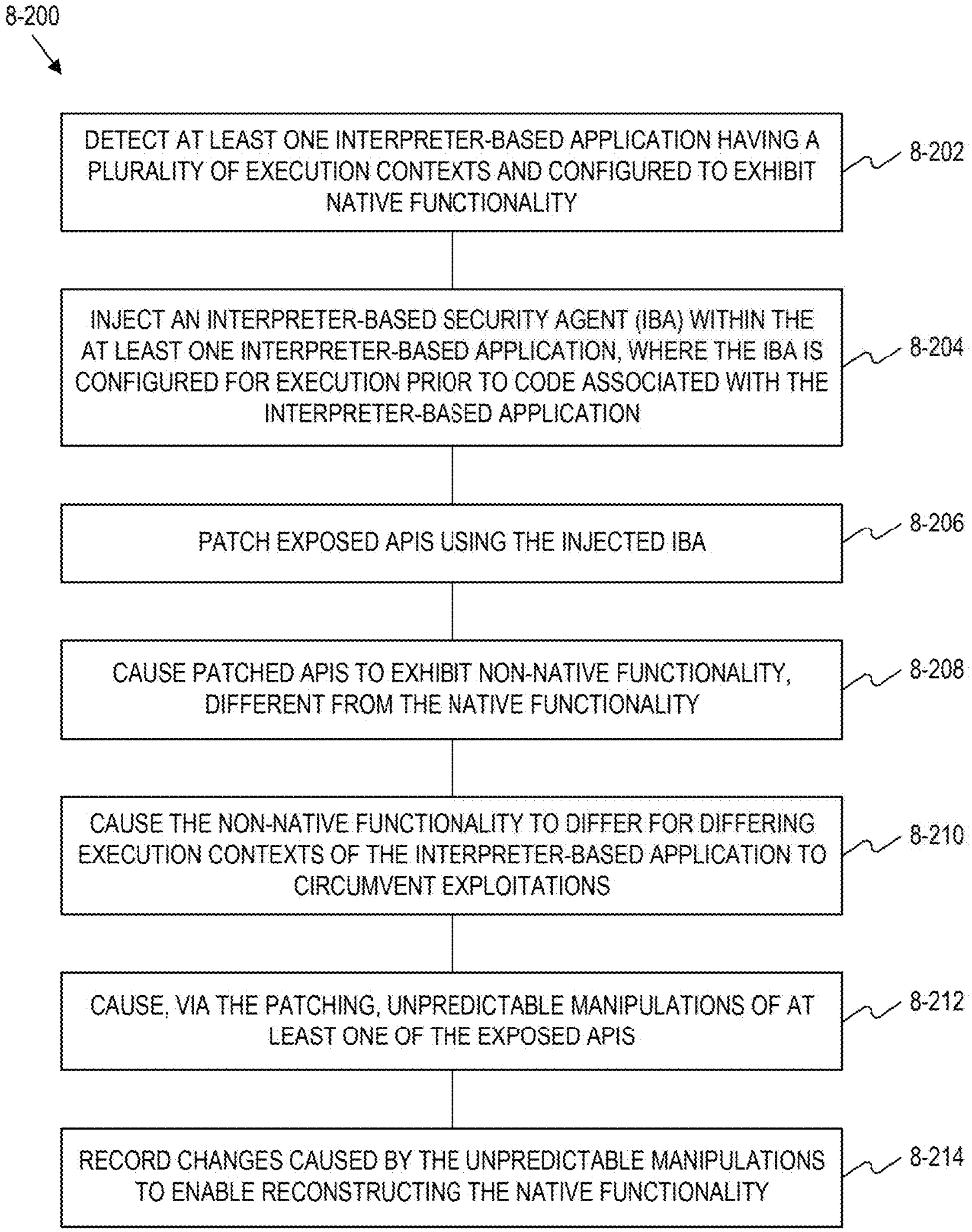

FIG. 8-1 illustrates an exemplary implementation of a system 8-100 for performing cybersecurity operations, consistent with disclosed embodiments. System 8-100 may include a host device 8-102, which may be communicably coupled with a device 8-110, such as over a network 8-112. In some embodiments, host device 8-102 may receive an input code 8-108 from device 8-110 via network 8-112. Device 8-110 may be situated locally or remotely and may be a server or proxy device. Network 8-112 may be a public or private communications network configured for local and/or remote communication (e.g., a local area network, LAN, or a wide area network, WAN).

Host device 8-102 and device 8-110 may include one or more processing devices, such as processor 102 of FIG. 1. Processing device 102 may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 102 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 102 may include at least one processor configured to perform functions of the disclosed methods such as a microprocessor manufactured by Intel™, Nvidia™, manufactured by AMD™, and so forth. Processing device 102 may include a single core or multiple core processors executing parallel processes simultaneously. In one example, processing device 102 may be a single core processor configured with virtual processing technologies. Processing device 102 may implement virtual machine technologies or other technologies to provide the ability to execute, control, run, manipulate, store, etc., multiple software processes, applications, programs, etc. In another example, processing device 102 may include a multiple-core processor arrangement (e.g., dual, quad core, etc.) configured to provide parallel processing functionalities to allow a device associated with processing device 102 to execute multiple processes simultaneously. It is appreciated that other types of processor arrangements could be implemented to provide the capabilities disclosed herein.

Consistent with the present disclosure, the methods and processes disclosed herein may be performed by server as a result of processing device 102 executing one or more sequences of one or more instructions contained in a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within the server, or at a remote location. Additionally, one or more computer-readable storage mediums may be utilized in implementing a computer-implemented method. The term "computer-readable storage medium" should be understood to include tangible items and exclude carrier waves and transient signals.

Some embodiments may involve detecting at least one interpreter-based application. An interpreter-based application may be any program, module, process, script, function, or computer code for understanding and/or manipulating interpretive language, and may include one or more of: a JavaScript enabled application, a client-side web browser application (e.g., Netscape Navigator, Microsoft Internet Explorer, Firefox, Safari, Opera, Google Chrome, Electron, QuickJS), and/or a server-side application (e.g., node.js). Detecting the at least one interpreter-based application (e.g., at least one JavaScript enabled application) may include one or more of determining that the interpreter-based application is installed on a computing device, identifying a runtime instance of the interpreter-based application, determining transmission of the interpreter-based application (e.g., by a computing device), determining receipt of the interpreter-based application (e.g., by a computing device), determining storage of the interpreter-based application (e.g., by a computing device), and/or performing any other action that indicates the presence of the interpreter-based application.

FIG. 8-1 illustrated one example of at least one interpreter-based application 8-104 that may be detected at host device 8-102. For example, interpreter-based application 8-104 may host an interpretive runtime environment 8-106, which may include an interpretive engine 8-114 for executing instructions, such as input code 8-108. Interpretive engine 8-114 may include a parser-116, a just in time (JIT) compiler 8-118, a heap 8-120 and/or a call stack 8-122. Parser 8-116 may identify and/or extract instructions in input code 8-108 (e.g., in the order of their appearance in input code 8-108). JIT compiler 8-118 may convert an extracted instruction to executable code and may push the executable code onto call stack 8-122, which may cause scheduling of execution of the executable code by a processor (not shown) of device 8-102. Input code 8-108 may include instructions written in one or more interpretative languages, such as one or more of HTML, CSS, JavaScript, PHP, Python, Perl, Ruby, SQL, Matlab, Lisp, SmallTalk, and Scala.

Executing input code 8-108 may cause an application (e.g., an interpreter-based application) to run on host device 8-102. In some embodiments, the input code may include JavaScript instructions. Moreover, interpreter-based application 104 may be a browser (e.g., a web browser), and the interpretive engine may be a JavaScript engine. When the JavaScript engine executes the JavaScript instructions, the browser may display a web page on a display (not shown) of host device 8-102.

An interpreter-based application may be configured to exhibit native functionality. "Native functionality" may refer to any degree of predictable or expected operations and/or runtime behavior that occurs when a computing device or system executes an original input code. For example, a particular functionality may normally occur when a computing device executes code that uses a known API, and therefore, that particular functionality may be characterized as predicted or expected (i.e., native), since predefined operations having known functions and/or functional effects are part of the typical operation. Examples of native functionality may include causing data to be written and/or read with respect to a predefined location in memory, scheduling a task according to a predefined sequence and/or timing, synchronizing an operation according to predefined criterion, allocating and/or freeing memory according to a predetermined set of criteria, or any other predetermined or predefined quantifiable computerized behavior of a computing device. The interpreter-based application may be configured to exhibit native functionality, for example by including code to call an API associated with that native functionality and/or by including code that performs an operation associated with that native functionality.

FIG. 8-1 demonstrates one example of a system for performing cybersecurity operations when an interpreter-based application is configured to exhibit native functionality. For example, interpreter-based application 8-104 configured with host device 8-102 may invoke an original, unmodified API that causes host device 8-102 to perform a predictable operation. In this case, interpretative based application 8-104 may exhibit native functionality when the original, unmodified API (e.g., original input code) is executed by host device 8-102. In some embodiments, native functionality may relate to one or more runtime behaviors or states of device 8-102, such as may relate to memory allocation and/or management, task scheduling and/or timing, data formatting, reading and/or writing, or any other observable operation performed by host device 8-102.

As another example, interpreter-based application 8-104 may exhibit native functionality when creating an array, such as array 402 of FIG. 4A. To create the array, the interpreter-based application may call an API to allocate memory for storing 8 sequential characters. Based on the native functionality for the API, interpretive engine 8-114 may, for example, create a single execution context and allocate all 8 placeholders for the array as 8 contiguous memory slots in heap 8-120. When the execution of the API terminates, based on the native functionality a garbage collector may be preconfigured to free all 8 contiguous memory slots from heap 8-120. An attacker may exploit this predictable behavior, for example, by injecting malicious code causing a reference to be written illegally, outside the range of the allocated memory slots, such as at a $9^{th}$ memory slot that is adjacent to the 8 contiguous memory slots. The attacker may be able to determine the physical location of the $9^{th}$ memory slot based on the native functionality for the API. The attacker may additionally determine that the garbage collector may free the 8 allocated memory slots when the execution context for the API terminates but may leave the $9^{th}$ memory slot untouched. This may allow the attacker to subsequently access the reference stored in the $9^{th}$ memory slot to launch an attack.

Some embodiments may involve an interpreter-based application being configured to generate a plurality of execution contexts following receipt of an original input code. An "execution context" may refer to a process, a program, an application, a frame, a file, a function, a container, a module, a call (e.g., an API call), one or more lines of code, a parameter, an argument, or any computerized information defining or influencing the computing environment in which a process runs. In some embodiments, an execution context may store information about the environment of code currently being executed (or code to be executed), such as a scope defining which variables, objects, parameters, and/or functions are accessible, regions of memory that have been allocated in the heap, or any other computerized parameter that may influence code execution. As discussed above regarding nested execution contexts, in some embodiments, multiple execution contexts may be present. "Original input code" may refer to at least one of unmodified source code to be executed by an interpreter-based application, code as it is received from a source, code as it is initially received by an interpreter-based application, or any code to which at least one manipulation may be applied. The original input code may be associated with a native functionality. For example, an API preconfigured with an interpreter-based application, such as a web browser may be original input code. When invoked by the web browser, the API may cause the web browser to exhibit native functionality. In some embodiments, generating each of the plurality of execution contexts may involve one or more operations associated with a creation stage and/or an execution stage. During a creation stage, the interpreter-based application may allocate memory to store any objects, variables, references, and parameters that may be used for executing code associated with the execution context. The memory may be allocated in random access memory (RAM), such as inside a logically defined heap memory within the RAM. During the execution stage, the execution context may be pushed onto a call stack to schedule execution of the code associated with the execution context. When executing the code within the execution context, the memory allocated during the creation stage may be accessed for any read and/or write instructions present within the code. Thus, the execution context may limit runtime memory access to regions that were allocated in the heap and may ensure that read and/or write operations are performed with respect to correct values and/or parameters. When the execution of the code is completed, the execution context may be popped off the call stack, in preparation for the next execution context. The call stack may operate, for example, according to a first-in/last-out (FILO) protocol, allowing for nested execution contexts whereby a new execution context may be pushed onto the call stack before a previous execution context has been removed (i.e., "popped"). This may allow the processor to execute a new function associated with the new execution context inside a function associated with the previous execution context.

FIG. 8-100 illustrates one example of an interpreter-based application configured to exhibit native functionality and generate a plurality of execution contexts following receipt of an original input code. Input code 8-108 may be an original input code as described above. Input code 8-108 may include multiple function calls, such as but not limited to APIs. When interpreter-based application 8-104 receives input code 8-108, a plurality of execution contexts may be generated for multiple functions called within input code 8-108 (e.g., a first execution context may be generated for a first function call and a second execution context may be generated for a second function call). To execute the functions sequentially, interpretive engine 8-114 may push the first execution context for the first function call to the top of call stack 8-122 to ensure that the first function is executed within the appropriate runtime environment. When the execution of the first function is completed, interpretive engine 8-114 may remove (i.e., "pop") the first execution context from stack 8-122. Interpretive engine 8-114 may then push the second execution context onto stack in preparation for executing the second function call. Of course, in some embodiments, a single execution context may be generated following receipt of an original input code.

Some embodiments may involve injecting an interpreter-based cybersecurity agent (IBCA) within the at least one detected interpreter-based application. An "interpreter-based cybersecurity agent" may refer to code, that when executed within an interpreter-based runtime environment, performs one or more actions to protect a computer system from a cybersecurity threat. Injecting the IBCA within the at least one detected interpreter-based application may include inserting, adding, removing, installing, or otherwise introducing within computer code (e.g., an application) one or more program code instructions or a reference thereto, that when executed by a processor, perform the actions of the IBCA. The cybersecurity threat may relate to any action that may potentially compromise the integrity, operation, safety, and/or security of a computer system and/or data stored therein. Non-limiting examples of an IBCA may include an HTML agent, CSS agent, JavaScript agent, PHP agent, Python agent, Perl agent, Ruby agent, SQL agent, Matlab agent, Lisp agent, SmallTalk agent, and/or a Scala agent. One or more of such agents can be executed, either alone or in combination, within an interpreter-based runtime environment to perform actions to protect a computer system from a cybersecurity threat.

FIG. 8-1 illustrates one example of interpreter-based application 8-104 injected with IBCA 8-130. Consistent with disclosed embodiments, a JavaScript cybersecurity agent (JSA), such as JSA 146 (discussed above), may be a particular instance of IBCA 8-130, and a JavaScript enabled application, such as a browser (e.g., a browser operating browser process 120), may be a particular instance of an interpreter-based application 8-104.

In some implementations, interpreter-based cybersecurity agent (IBCA) 8-130 may be configured in advance with interpreter-based application 8-104. In some embodiments, the term "configured with" may be understood to mean that after IBCA 8-130 is injected with interpreter-based application 8-104, IBCA 8-130 may remain persistent (e.g., continue to exist even after interpreter-based application 8-104 has been shut down). In this case, IBCA 8-130 may be injected into interpreter-based application 8-104, such as prior to receiving input code 8-108 from device 8-110. In some embodiments, interpreter-based application 8-104 may execute IBCA 8-130 on host device 8-102 in scenarios where input code 8-108 is received as original, i.e., unmodified, input code. In other implementations, interpreter-based application 8-104 may receive IBCA 8-130 from an external source. For example, when device 8-110 receives a request for input code 8-108 from interpreter-based application 8-104, device 8-110 may, prior to serving original input code 8-108 to interpreter-based application 8-104, inject IBCA 8-130 into original input code 8-108, to generate a modified input code (not shown), which may include both original input code 8-108 and code associated with IBCA 8-130. In some embodiments, interpreter-based application 8-104 may distinguish between code associated with IBCA 8-130 injected therein and original input code 8-108, such as through direct line-to-line comparison or examination of functionality (e.g., a sequence of memory and/or processing operations).

In some embodiments an injected interpreter-based cybersecurity agent (IBCA) may be configured for execution prior to execution of the original input code by the interpreter-based application. Being configured for execution prior to execution of the original input code may include inserting the IBCA into a portion of the original input code (e.g., a top portion) that will execute before the original input code itself and/or by generating code that will cause an application to execute the injected IBCA prior to executing the original input code.

FIG. 8-1 illustrates one example of an interpreter-based application 8-104 configured to execute IBCA 8-130 prior to executing original input code 8-108. For example, interpreter-based application 8-104 may automatically execute the IBCA 8-130 first, before executing instructions of original input code 8-108 (e.g., when IBCA 8-130 is preconfigured with interpreter-based application 8-104, before receiving original input code 8-108). For example, interpreter-based application 8-104 may receive a sequence of instructions to execute, and instructions associated with IBCA 8-130 may appear first in the sequence, relative to instructions of original input code 8-108. Moreover, when the interpreter-based application 8-104 receives from device 8-110 modified input code, which may include both original input code 8-108 and IBCA 8-130 injected therein, interpreter-based application 8-104 may execute IBCA 8-130 first, before executing original input code 8-108.

In some embodiments, the injected interpreter-based cybersecurity agent may be configured for execution prior to execution of the original input code with each of the plurality of execution contexts. For example, the injected IBCA may be configured to execute prior to the execution of at least a portion of a plurality of execution contexts generated by the interpreter-based application. In some embodiments, the injected IBCA may be configured to execute once, prior to execution of input code associated with multiple execution contexts. In some embodiments, the injecting may occur within each of the plurality of execution contexts before the original input code is executed by the interpreter-based application. For example, the injected IBCA may be configured to execute multiple times, such as prior to first input code associated with a first execution context, prior to second input code associated with a second execution context, and intermittently prior to any number of discrete portions of input code associated with different execution contexts.

FIG. 8-1 illustrates one example of interpreter-based application 8-104 generating multiple execution contexts for input code 8-108, such as a separate execution context corresponding to function calls (e.g., separate execution contexts corresponding to each function call within original input code). In some embodiments within each of the generated execution contexts, interpreter-based application 8-104 may execute IBCA 8-130 first, before executing an instruction of original input code 8-108. In some embodiments, for one or more execution contexts (e.g., for each execution context), IBCA 8-130 may be injected within interpreter-based application 8-104 before interpreter-based application 8-104 executes an instruction of original input code 8-108.

Some embodiments may involve patching exposed application programming interfaces (APIs) (or a single exposed API) using the injected interpreter-based cybersecurity agent (IBCA), where the patching is configured to cause patched APIs to exhibit non-native functionality different from the native functionality. Forms of the word "patch," such as "patched" or "patching" may refer to wrapping an original, unmodified API call with program code instructions, such that the resulting "patch," when executed, may override one or more functionalities of the original, unmodified API. As discussed herein, patching may also involve causing at least one exposed API to exhibit different functionality (i.e., non-native functionality) by performing an operation that differs from an operation that is expected to be performed when executing the original input code (i.e., the native functionality for the exposed API). An "exposed API" may refer to an original, unmodified API. For example, an unpatched API call referenced by the original input code may be an exposed API. In some embodiments, an exposed API may cause at least one processor to perform one or more predictable operations and may thus be associated with a native functionality. Non-native functionality" may relate to behavior or performance of one or more actions that may differ from preconfigured behavior and/or actions typically associated with original, unmodified input code (i.e., exhibiting native functionality). For example, a patched API may exhibit non-native functionality as unpredictable runtime behavior that differs from a predictable runtime behavior typically associated with an original, unmodified API. As another example, an original, unmodified API (i.e., exposed API) may be expected to cause memory to be allocated and/or freed in a predictable manner and thus exhibit native functionality. By contrast, after patching the original, unmodified API, the patched API may cause memory to be allocated in an unpredictable manner and thus exhibit non-native functionality that differs from the native functionality. In some embodiments, exhibiting non-native functionality may include causing a non-predictable environment state.

Turning to the example of FIG. 8-1, a wrapper 8-134 of IBCA 8-130 may patch one or more exposed APIs configured with interpreter-based application 8-104 (e.g., when interpreter-based application 8-104 executes IBCA 8-130), to generate one or more patched APIs. In some embodiments, the patching may cause a subsequent execution of the API to be intercepted (e.g., during runtime), and control of the execution of the API to be transferred to IBCA 8-130. In some embodiments, the patching may cause the patched APIs to exhibit non-native functionality, such as when executed by device 8-102 (e.g., after control of execution is transferred). IBCA 8-130 may induce an unpredictable environment state during the execution of the API, which may cause the API to exhibit the non-native functionality that differs from the native functionality of the original, unmodified API. An "environment state" may refer to an operating condition or operating mode for at least one processor (or a computer or system associated with at least one processor). For example, an environment state may relate to the scheduling and/or timing of computing tasks, access to computing resources, permissions (e.g., scope) relating to variable, parameters, arguments, objects, data, and other characteristics affecting the operation of a computer. Thus, the patched API may exhibit one or more unpredictable characteristics relating to any of memory allocation and/or management, sequence of execution, a data format, scheduling (e.g., task scheduling), timing, or any other observable or quantifiable computerized behavior of device 8-102 or other device. In some embodiments, wrapper 8-234 may be invoked for each execution context initiated by interpreter-based application 8-104 and may thus be invoked within a global execution context, as well as within nested execution contexts.

Some embodiments may involve patching the exposed application programming where the patching is configured to cause unpredictable manipulations of at least one of the exposed APIs. "Unpredictable" may refer to a characteristic that may be erratic, uncertain, and generally non-calculable towards a deterministic outcome. "Manipulations" may refer to one or more actions or maneuvers that modify or alter a situation, such as an environment state.

FIG. 8-1 illustrates an example for patching an exposed API call via wrapper 8-134 of IBCA 8-130 to cause unpredictable manipulations, such as may relate to one or more environment states during runtime. The patching may manipulate runtime state characteristics relating to at least one of memory allocation and management, a sequence of execution, a data format, scheduling (e.g., task scheduling), timing, synchronization, or any other observable or quantifiable computerized behavior of device 8-102 or other device. For example, IBCA 8-130 may create multiple execution contexts and split the execution of the API across the different execution contexts. Additionally, or alternatively, IBCA 1-230 may allocate memory in heap 8-120 at randomly located slots such that any read and/or write operations invoked by the API are performed with respect to the randomly located memory slots. In some embodiments, the manipulation associated with IBCA 8-130 may only be performed with respect to APIs that affect interpretive runtime environment 8-106, such as APIs that allocate memory and/or manipulate user input. In some embodiments, IBCA 8-130 may serialize invocation parameters for telemetry and/or invoke an execution control module. The term "telemetry" may be understood to mean the transmission of data from one or more remote sources for a purpose of tracking and/or monitoring. For example, a native API may be invoked with multiple arguments, some of which may be complex objects. In such a case, a complex object may be serialized, e.g., transformed into a string representation, such as for the purpose of recording data or sending data as telemetry. In some embodiments, such as when one or more conditions are met, an invocation may be diverted to IBCA 1-230, which may control (e.g., abort, divert, delay, emulate) the invocation based on certain rules.

Some embodiments may involve patching exposed APIs where the non-native functionality differs for differing execution contexts of the interpreter-based application in order to thwart exploitations. Instances of non-native functionality "differ," from each other when, for example, they exhibit one or more characteristics that distinguish one from the other. For example, each execution context may exhibit a different non-native functionality, which may be expressed as a distinct runtime environment state for that execution context. The distinct runtime environment state may refer to different computing results and/or operations (e.g., caused by the same or different intercepting codes).

FIG. 8-1 illustrates one example of differing non-native functionalities for different execution contexts. For example, input code 8-108 may include a first call and a second call to an API that has been patched by wrapper 8-134. The two calls to the API may be used to create two separate array objects. Interpreter-based application 8-104 may generate a first execution context for the first API call and may generate a second execution context for the second API call. The non-native functionality caused by patching the API (e.g., non-native functionality occurring using one or more patched APIs) may be different for each call to the patched API. Thus, executing the API (e.g., patched API) within the first execution context may cause a different non-native functionality than executing the API within the second execution context. Referring to the example above, the creation of the first array object may be split over two execution contexts and memory may be allocated in three different areas of heap 8-122, whereas the creation of the second array object may be split over five execution contexts and memory may be allocated in two different areas of heap 8-122. In other words, the same API call may behave differently and depart from the native functionality in a different way each time it is called, causing a non-predictable environment state during runtime. Such unpredictability may facilitate the thwarting of malicious exploitations of the environment state.

For example, IBCA 8-130 may thwart the attack described above with respect to FIG. 4A. Prior to executing original input code 8-108, IBCA 8-130 may wrap exposed APIs such that when an API is subsequently invoked (e.g., after having been wrapped), the execution of the API is intercepted and transferred to IBCA 8-130, which may perform a combination of any number of data manipulations or other operations to produce a non-predictable environment state, consistent with disclosed embodiments. For example, as shown in exemplary FIGS. 4A-4C, IBCA 8-130 may split the execution of the API across multiple execution contexts and cause read and/or write operations to be performed at randomly allocated memory slots of heap 8-120. Consequently, an attacker may not be able to recover a reference illegally stored in heap 8-120 and an attack may be inhibited or prevented.

Some embodiments may involve detecting the original input code in transit. As used herein, the term "in transit" may refer to a preparatory (e.g., unexecuted) state for the original input code before the original input code is executed and/or a state where the original input code has not yet been received by, or may be executed by, a particular device (e.g., host device 8-102). Detecting original input code may include accessing, diverting, receiving, requesting, or otherwise determining original input code. FIG. 8-1 illustrates an example of original input code 8-108 in transit, such as while stored in a file at device 8-110, while stored in memory awaiting execution at host device 8-102, or while in other intermediate state prior to execution. For example, original input code 8-108 may be source code for a web page, and device 8-110 may be a server that serves the web page on request. After host device 8-102 receives original input code 8-108 from device 8-110, host device 8-102 may detect original input code 8-108. However, until host device 8-102 executes original input code 8-108, original input code 8-108 may be in transit.

In some embodiments the injecting occurs at a top portion of the original input code to generate a modified input code and to thereby enable the interpreter-based cybersecurity agent to be executed before the original input code is executed. A "top portion" may refer to a segment or part of a file that is read before other portions of the file are read. The top portion may be read first by being inserted (e.g., injected) into the first row or rows of the file, or via a reference inserted into the first row or rows of the file. For example, code instructions for implementing the IBCA may be inserted into the topmost portion of a file containing input code. Alternatively, a reference to code instructions for implementing the IBCA may be inserted into the topmost portion of the file containing input code.

FIG. 1-8 illustrates an example for injecting IBCA 8-130 into an upper (e.g., topmost) portion of a file containing original input code 8-108 (e.g., prior to serving original input code 8-108), to generate modified input code that may include IBCA 8-130. Device 8-110 may serve the modified input code to host device 8-102, such that device 8-102 may execute IBCA 8-130 before executing original input code 8-108.

In some embodiments detecting the original input code occurs via a local proxy. A "local proxy" may refer to an intermediate device that may interface between a host device and a communications network. The intermediate device may be connected to the host device locally and may intercept a file received via the communications network and perform one or more operations before transferring the file to the host device. For example, the local proxy may perform one or more cybersecurity operations.

Turning to the example of FIG. 8-1, device 8-110 may be a local proxy acting as an intermediary between host device 8-102 and a remote server (e.g., web server 142 of FIG. 1) and network 8-112 may be a local area network (LAN). When host device 8-102 requests original input code 8-108 from the remote server, device 8-110 may intervene and may detect original input code 8-108 while original input code 8-108 is in transit towards host device 8-102. In some embodiments, device 8-110 may inject IBCA 8-130 into (or adjacent to) original input 8-108 such that host device 8-102 receives modified input code with IBCA 8-130 injected therein (or thereby, as the case may be).

In some embodiments detecting the original input code may occur via a local virtual private network (VPN) server. The term "VPN" as used herein may refer to a virtual or logical channel that enables two devices to establish a private communications session over a public network. A local virtual private network server may include any computing device within, or otherwise associated with, a VPN. Turning to the example of FIG. 8-1, device 8-110 may be a local VPN server enabling private communication across a public network (not shown). Device 8-110 may operate as described above. Additionally, or alternatively, a remote VPN server may also detect the original input code.

In some embodiments, detecting the original input code occurs via a native application configured to monitor files associated with the interpreter-based application. A "native application" may refer to code configured to operate within a specific platform, operating system, or one or more device-specific characteristics such as relating to a processor, bus size, memory size, processor, or other computing resources used to execute the application. For example, the native application may check, track, and/or scan incoming files to determine the language (e.g., HTML, CSS, JavaScript, Python) of any instructions included therein. Since a system may be configured with multiple interpretive engines to execute different interpretive languages, the native application may indicate which interpretive engine should be used to execute the instructions of the original input code. Turning to the example of FIG. 8-1, interpreter-based application 8-104 may include a native application to automatically monitor incoming files of input code. In some embodiments, the native application may detect original input code 8-108 locally at host device 8-102. The native application may indicate interpretive engine 8-114 as a suitable interpretive engine for executing original input code 8-108.

When the IBCA is a JavaScript application (JSA), some embodiments may further involve installing a node.js package in the web application, and wherein the node.js package is configured to execute the JavaScript cybersecurity agent before code of the web application is executed. The term "web application" as used herein may refer to an application that is configured to be executed on a web server, as opposed to via an operating system of a personal computer. The term "Node.js" as used herein may refer to a framework for developing applications in JavaScript. The Node.js package may be configured to execute the JSA before code of the web application is executed.

Turning to the example of FIG. 8-1, interpreter-based application 8-104 may be a JavaScript enabled web application, such as to provide electronic mail, online retail, or banking services, and host device 8-102 may operate as a server. By way of further example, interpreter-based application 8-104 may be a nodeJS application, and host device 8-102 may be operable as a web server. A JavaScript-compatible runtime package, such as Node.js, Active Server Pages (ASP), Common Gateway Interface (CGI), ColdFusion, Dart, Jakarta servlet (JSP), Ruby on Rails, may be installed in interpreter-based application 8-104 such that device 8-102 may execute the JSA before executing input code 8-108.

When the IBCA is a JSA, in some embodiments injecting may occur in a top portion of web application source code to enable pages sent to browsers to contain the JavaScript cybersecurity agent and to execute in the browsers before the web application code is executed. "Web application source code" may refer to one or more program code instructions that when executed by a processor, implement the web application. The term "pages" as used herein may refer to files containing source code, that when executed via a web browser on a host computer, display or render one or more images (e.g., of a web site) on the host computer.

Turning to the example of FIG. 8-1, device 8-110 may provide at least one online service by serving one or more web pages to device 8-102. In some embodiments, device 8-110 may inject the JSA into a portion (e.g., a top portion) of original input code 8-108. This may enable a web browser, such as interpretive-based application 8-104 (e.g., running on host device 8-102), to receive (e.g., from device 8-110) one or more pages that may already contain the JSA. In some embodiments, host device 8-102 may execute the JSA in interpretive-based application 8-104 before executing original input code 8-108. For example, device 8-110 may provide a new online service, such that a web page that is served (e.g., every webpage served) includes the JSA injected therein.

Some embodiments may involve recording changes caused by the non-native functionality to thereby enable reconstruction of original functionality. The term "recording" as used herein may refer to logging, saving, documenting, or otherwise storing information relating to the changes so that the changes may be tracked and referenced later. For example, the changes may be stored in a list, table, map, or other data structure for future reference.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Turning to the example of FIG. 8-1, IBCA 8-130 may record changes caused by the non-native functionality to enable reconstructing the original functionality (e.g., by IBCA 8-130 or other computing entity). For example, IBCA 8-130 may record the changes in a mapping 8-136, which may track one or more manipulations (e.g., introduced when the exposed APIs were patched). Mapping 8-134 may store references and/or locations of at least one argument, object, function, or variable within an execution context (e.g., within each execution context). IBCA 8-130 may reference mapping 8-136 while executing patched APIs to enable reconstructing the functionality of the original, unmodified APIs. Mapping 8-136 may thus allow to maintain the functionality of non-malicious APIs, while thwarting malicious APIs. In some embodiments, IBCA 8-130 may reconstruct functionality of an original, unmodified API (e.g., based on or using a mapping 8-136).

For example, based on the non-native functionality, memory may be freed in a random manner, such as according to a random sequence, timing, and the like. Alternatively, memory may be freed when a predefined condition is met. Mapping 8-136 may be used to ensure that reading and/or writing operations are targeted to intended values in memory, which may ensure proper execution of legitimate APIs within an unpredictable execution environment. In some embodiments, to maintain proper execution, IBCA 8-130 may create a proxy object to reference mapping 8-134 and may return to the invocation of the native API.

The following is an exemplary list of operations that IBCA 8-130 may apply (in any combination, including repetition of operations) to dynamically manipulate an environment state to exhibit non-native functionality, and thereby thwart an attempt to exploit native functionality. The IBCA's operations, may include, but need not include all of the following (i.e., the operations may be a subset of the following list):

Allocate memory for an object at an unpredictable location.

Store an object in memory that is not freed by the garbage collector. The object may be referenced by IBCA 8-130.

Define an unpredictable structure for an object.

Create a random number of execution contexts for executing a function. The execution contexts may be implemented as one or more inline frames. IBCA 8-130 may be executed separately within each execution context, or across one or more nested execution contexts.

Divide input data into random subsets, each subset corresponding to a different execution context.

Rearrange input data into random subsets, each subset corresponding to a different execution context.

Split and/or rearrange arguments into random subsets.

Create, for one or more of the random subsets above, a separate object, such as an array.

Define randomized object properties, such as a random length, or a random ordering for nodes.

Define random inline properties, such as strings.

Introduce randomness into the execution flow by manipulating interrupts.

Manipulate the input code, e.g., by randomly padding and/or encoding the payload.

Encode a randomly selected argument associated with the API invocation.

Encode a randomly selected argument associated with the input data.

Pad a randomly selected argument with random data.

Add a random number of inline properties to input data and/or return values and set these to random values.

Add a random number of inline properties to an object and set these to random values.

Create a random number of objects, each having a random number of properties and random length primitives, Introduce random latency to thwart an attack aimed at predictable clock logic associated with the native functionality.

Manipulate class prototypes that may be likely to be exploited in an attack.

Shadow or clone an object or property that is shareable across multiple execution contexts to ensure that manipulations performed on the cloned object are mirrored on the original object (and vice versa) in a random and unpredictable manner.

Deoptimize an object structure or code to thwart an attack aimed at optimization characteristics.

Prompt a forced side effect. For example, when a dramatic shape mutation has been detected for an object in a specific state of the execution environment, the object may be inspected to determine if the object was corrupted. The term "dramatic shape mutation" may be understood as a situation when an object undergoes a significant change, such is a length property has changed dramatically or if multiple descriptors have been added to the object, or any other change that dramatically or significantly changes the structure of the object. A change may be considered significant if a quantified threshold of similarity (or dissimilarity) is exceeded (e.g., a number or percentage in common of descriptors, length properties, characters, or values), such as based on a comparison of an original object with a changed object.

The foregoing list is exemplary only and not exhaustive. In some embodiments, a manipulated JavaScript environment may cause legitimate and malicious code alike to exhibit non-native functionality, which may cause one or more unpredictable effects on an execution environment.

In some embodiments, actions may be performed by IBCA 8-130 so as to not disrupt the execution of legitimate code in a manner to significantly impact performance. For example, one or more precautions may be enforced to prevent important, sensitive, or confidential information from leaking, e.g., when a sensitive object is optimized for execution. IBCA 8-130 may operate in the absence of malicious code and in a manner that is undiscoverable by an attacker. For example, a precaution may be enforced that ensures that a patched API returns substantially the same values (e.g., exceeding a threshold number or percentage of same values within a set) as a corresponding native (e.g., exposed) API, such as for specific properties (e.g., type, length). In such a case, if the attacker attempts to detect if a call has been implemented by a native API, or a different (e.g., wrapped) API, the attacker may not be able to distinguish between the two, and may determine that a native API has implemented the call. In some embodiments, IBCA 8-130 may run at the application level without having to access an operating system, which may allow IBCA 8-130 to run on a restricted device (e.g., devices with restrictive policies enforced thereon that block unauthorized access to system resources and functionalities). In some embodiments, IBCA 8-130 may intercept and/or identify one or more exposed APIs, which may be configured to manipulate objects stored at a backing store, consistent with embodiments discussed herein. An exposed API may be detected during execution, based on a predefined list of APIs or instructions. A manipulation of an execution environment (e.g., by IBCA 8-130) may cause the manipulation of the backing store object to proceed in an unpredictable manner. In some embodiments, IBCA 8-130 may limit interception to APIs that receive data from an untrusted source and/or to APIs that relate to backing store objects, such as array constructors, object constructors, typed arrays, array buffers, collections, Atomics objects, DataView calls, and the like, consistent with embodiments discussed herein.

Notably, manipulation of an execution environment (e.g., by IBCA 8-130) may thwart malicious code from exploiting predictable aspects of the original, native execution environment. For example, malicious code attempting to exploit a predictable memory layout or location, a predictable behavior of a garbage collector for freeing memory, a timing or scheduling characteristic, a synchronization of the original execution environment, or any other expected or predictable result or operation of an execution environment may fail in the manipulated, unpredictable execution environment.

Consistent with some disclosed embodiments, including those disclosed above, a computing device (e.g., processor 102 of FIG. 1) may perform operations for performing cybersecurity operations, consistent with disclosed embodiments. The computing device may use any one of a number of components for performing the operations for performing cybersecurity operations, such as an engine (e.g., JavaScript engine 130) or a proxy (e.g., proxy 148).

FIG. 8-2 illustrates a block diagram of an example process 8-200 for performing cybersecurity operations, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 8-2. In some embodiments, the process 8-200 may be performed by at least one processor (e.g., process 102 of FIG. 1) of a computing device to perform operations or functions described herein. In some embodiments, some aspects of the process 8-200 may be implemented as software (e.g., program codes or instructions) that are stored in a memory (e.g., memory 110 in FIG. 1) or a non-transitory computer-readable medium. In some embodiments, some aspects of the process 8-200 may be implemented as hardware (e.g., a specific-purpose circuit). In some embodiments, the process 8-200 may be implemented as a combination of software and hardware.

FIG. 8-2 includes process blocks 8-202 to 8-214. At block 8-202, a processing means (e.g., processor 102 of FIG. 1) may detect at least one interpreter-based application. In some embodiments, the interpreter-based application may have a plurality of execution contexts and/or may be configured to exhibit native functionality. For example, turning to the example of FIG. 8-1, interpreter-based application 8-104 may be detected. An interpreter-based application may have multiple execution contexts and/or may exhibit conventional, predictable functionality. For example, interpreter-based application may be a JavaScript enabled web browser and may have a set of known functionalities (e.g., with predictable behavior).

At block 8-204, a processing means may inject an interpreter-based cybersecurity agent (IBCA) within the at least one detected interpreter-based application. The injected interpreter-based cybersecurity agent may be configured for execution prior to code associated with the interpreter-based application. For example, turning to the example of FIG. 8-1, IBCA 8-130 may be injected within interpreter-based application 8-104. IBCA 8-130 may be configured to be executed by host device 8-102 before host device 8-102 executes other code associated with interpreter-based application 8-104. For example, host device 8-102 may execute IBCA 8-130 before executing input code for rendering a web page via interpreter-based application 8-104.

In some embodiments, original input code may be detected in transit, and the IBCA may be injected at a top portion of the input code to generate a modified input code, which may enable the IBCA to be executed before the original input code is executed. In some embodiments, the injected IBCA may be executed prior to code associated with each of the plurality of execution contexts. In some embodiments, the IBCA is injected in the plurality of execution contexts (e.g., each of the plurality of execution contexts) before other code is executed by the interpreter-based enabled application.

At block 8-206, the processing means may patch one or more exposed APIs are patched using the injected IBCA. Turning to the example of FIG. 8-1, IBCA 8-130 may patch exposed APIs configured with interpreter-based application 8-104.

At block 8-208, the processing means may cause (e.g., according to the patching) the patched APIs to exhibit non-native functionality different from the native functionality. For example, turning to the example of FIG. 8-1, the patching of the APIs may cause non-native functionality to be exhibited when the APIs are executed by device 8-102. The non-native functionality may exhibit non-predictable runtime behavior, which may differ from the predictable runtime behavior normally expected when executing the exposed APIs on device 8-102.

A block 8-210, the processing means may cause (e.g., via the patching) the non-native functionality to differ for differing execution contexts of the interpreter-based enabled application in order to circumvent exploitations. For example, turning to the example of FIG. 8-1, the non-native functionality may be different for each of the execution contexts of interpretive-based application 8-104. Thus, executing the same API twice via interpreter-based application 8-104 may exhibit two different non-native functionalities.

At block 8-212, the processing means may cause (e.g., via the patching) unpredictable manipulations of at least one of the exposed APIs. For example, turning to the example of FIG. 8-1, IBCA 8-130 may cause unpredictable manipulations of at least one of the exposed APIs called in input code 8-108.

At block 8-214, the processing means may record changes caused by the non-native functionality, to thereby enable reconstruction of native functionality. Turning to the example of FIG. 8-1, IBCA 8-130 may record changes caused by the non-native functionality in mapping 8-136 to enable reconstructing the native functionality of the patched API.

Figures 3A, 8:
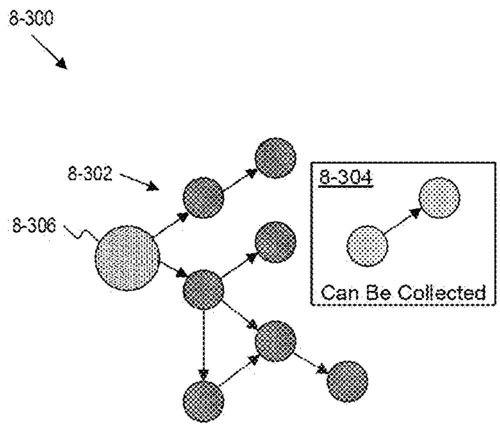
Figures 3B, 8:
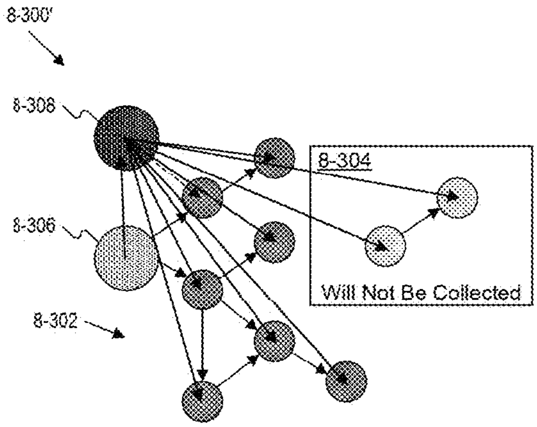

To further illustrate embodiments discussed herein, reference is now made to FIGS. 8-3A and 8-3B, which illustrate an exemplary implementation for manipulating a runtime environment to prevent the freeing of memory, consistent with disclosed embodiments. Referring to FIG. 8-3A, a structure 8-300 shows an organization of data in memory (e.g., memory 110). Structure 8-300 may include separate data trees, such as the two separate data trees shown in the figures, data tree 8-302 and data tree 8-404. A data tree may descend from a root node. For example, as shown in the figures, data tree 8-302 may descend from a root node 8-306. A data tree may also be disconnected from a root node. For example, data tree 8-304 may be disconnected from root node 8-306. In some embodiments, a garbage collector (e.g., configured with a runtime environment) may free memory (e.g., some memory, all memory) for data tree 8-304, such that the data stored in data tree 8-304 can be overwritten. Referring to FIG. 8-3B, a structure 8-300' shows a manipulation of data structure 8-300 of FIG. 7A. Structure 8-300' also includes an IBCA root object 8-308, which may be connected to at least one data object of tree 8-302 and/or at least one data object of tree 8-304 (e.g., all data objects of tree 8-302 and/or tree 8-304). Consequently, the garbage collector may not free the memory for data tree 8-304, such that the data stored in data tree 8-304 is not overwritten.

As indicated above, an interpreter-based application may be associated with an execution context, or with multiple execution contexts. As described earlier, an "execution context" may refer to a process, a program, an application, a frame, a file, a function, a container, a module, a call (e.g., an API call), one or more lines of code, a parameter, an argument, or any computerized information defining or influencing the computing environment in which a process runs. For example, an interpreter-based application may operate according to an execution context, may implement an execution context, may access code associated with an execution context, may detect an execution context and/or associated code, may be computationally connected (e.g., through computerized code) with an execution context, and/or may exist with an execution context. In some embodiments, an interpreter-based application may be configured to execute code associated with an execution context, consistent with disclosed embodiments. For example, an interpreter-based application may include code that, when executed, accesses an execution context and executes code associated with the execution context (e.g., input code, patched code, injected code, inserted code, agent code, replacement code, initialization code).

An execution context may have at least one exposed API. For example, a first execution context may have at least one first-execution-context exposed API, and a second execution context may have at least one second-execution-context exposed API. An API may include at least one of a call, a function, a command, a module, a frame, an argument, at least one line of code, an object, a reference, or any other information associated with executable code, consistent with disclosed embodiments. An exposed API may be an API that is configured to exhibit native functionality (e.g., native API functionality), includes malicious code (e.g., input code), includes benign code (e.g., input code), includes code unchanged since receipt, includes un-directed code, includes unanalyzed code, and/or includes any code that may give rise to a potential cyberspace vulnerability. For example, an execution context may include code (e.g., input code) that may cause execution of unintended or malicious operations (e.g., by a web browser, application, program, or other computing element). In some embodiments, as mentioned above, an exposed API may be detected during execution, such as based on a predefined list of APIs or instructions.

Consistent with some disclosed embodiments, at least one processor may be configured to access an interpreter-based application. Accessing an interpreter-based application (which may be associated with a first execution context having at least one first-execution-context exposed API) may include at least one of launching an interpreter-based application, initializing an interpreter-based application, running an interpreter-based application, receiving code configured for execution by an interpreter-based application, or performing any operation to bring an interpreter-based application to a state for executing and/or manipulating code. In some embodiments, accessing an interpreter-based application may include accessing input code and/or intercepting code (discussed below). For example, accessing an interpreter-based application may include accessing input code associated with an execution context, such as a first execution context (which may be referred to as first-execution-context input code).

Input code may include at least one of code received from an external device, code received from an internal device, malicious code, benign code, code unchanged since receipt, un-directed code, unanalyzed code, any code that may give rise to a potential cyberspace vulnerability, or any code described above with respect to original input code. For example, input code may include at least one of a call, a function, a command, a module, a frame, an argument, at least one line of code, an object, or a reference, any of which may be associated with an API. In some embodiments, input code may be received by (e.g., for execution by) a particular application, such as a JavaScript application, a web browser, or any interpreter-based application. Input code may be retrieved from memory, received from a remote device (e.g., across a network, such as the world wide web), and/or stored in memory. As discussed herein, input code may include code configured to exhibit native API functionality.

Intercepting code may include at least one of an algorithm, a wrapper, an agent, a pointer, a call, a memory location, a function, a command, a module, a frame, an argument, at least one line of code, an object, a reference, or any other computing language configured to influence input code (e.g., by causing the input code to exhibit non-native functionality, as discussed herein). In some embodiments, intercepting code may be received by (e.g., for execution by) a particular application, such as a JavaScript application, a web browser, or any interpreter-based application. Intercepting code may be retrieved from memory, received from a remote device (e.g., across a network, such as the world wide web), and/or stored in memory.

Some embodiments may involve executing a first intercepting code prior to execution of first execution context input code. Executing a first intercepting code prior to execution of first-execution-context input code may include at least one of adding code, inserting code, deleting code, modifying code, replacing code, disabling code, or performing any operation to cause the intercepting code to influence the input code. For example, executing intercepting code may include inserting intercepting code, in an execution sequence, to a position before input code. Additionally or alternatively, executing intercepting code prior to execution of input code may include applying the intercepting code to an execution context (e.g., a first execution context, which may be associated with first-execution-context input code). In some embodiments, the first intercepting code may be configured to patch the at least one exposed API (e.g., the first-execution-context exposed API). Patching the at least one exposed API may include causing the at least one exposed API to exhibit different functionality (e.g., different from functionality associated with original input code), such as non-native functionality (e.g., functionality not native to the at least one exposed API), as discussed further herein (e.g., causing a non-predictable environment state). For example, patching may include re-directing code associated with the at least one exposed API (e.g., at least a portion of input code) to a different API, different function, or other code not implemented by the at least one exposed API (e.g., in a manner unanticipated from the perspective of the original input code), and the different API, function, or other code may carry out the non-native functionality, consistent with disclosed embodiments. For example, this may involve diverting an API call associated with input data that may result in manipulation of a backing store object, as described herein. Patching may also include at least one of determining a manipulation to implement (e.g., associated with the non-native functionality) or generating code to implement the non-native functionality, as discussed elsewhere herein, for example by splitting arguments into subsets and rearranging the split arguments in different argument subsets. In some embodiments, patching a native API may cause code that attempts to use that native API (e.g., at least a portion of input code and/or code associated with a particular execution context) to instead use the patched API instead. Additionally or alternatively, patching may include replacing code that implements native functionality of the at least one exposed API with code that implements non-native functionality of the API. In some embodiments, the patching may be implemented prior to the first input code having (or being permitted to have, such as by an interpreter-based application) access to the at least one first-execution-context exposed API.

Some disclosed embodiments may involve determining whether the first-execution-context input code generates a second execution context having at least one second-execution-context exposed API. Determining whether the first-execution-context input code generates a second execution context may include at least one of parsing the first-execution-context input code, analyzing the first-execution-context code (e.g., using static and/or dynamic analysis), simulating the first-execution-context input code, or identifying particular information included in or indicated by the first-execution-context code. For example, determining whether the first-execution-context input code generates a second execution context having at least one second-execution-context exposed API may include identifying, within input code, at least one of an identifier (e.g., a source identifier), a trigger, a particular string of code, a particular function, or any other code that implicates the second execution context. The second execution context may have at least one second-execution-context exposed API, which may also be determined in addition to determining whether the first-execution-context input code generates a second execution context. A second-execution-context exposed API may be associated with the second execution context, and may include any aspect of a first-execution-context exposed API (though with respect to the second execution context). In some embodiments, determining whether the first-execution-context input code generates a second execution context having at least one second-execution-context exposed API may be accomplished (e.g., by at least one processor) through the execution of the first intercepting code. For example, while implementing the first intercepting code, at least one processor may determine that the first execution context implicates a second execution context. Additionally or alternatively, a dedicated API (e.g., executed by at least one processor), which may be part of an engine (e.g., an interpreter-based application engine), may determine whether the first-execution-context input code generates a second execution context having at least one second-execution-context exposed API.

The first-execution-context input code generating a second execution context may include at least one of the first-execution-context input code executing the second execution context, pointing to the second execution context, calling the second execution context, or including code associated with the second execution context. For example, the second execution context may be nested within the first execution context. This nesting may occur, for example, when the second execution context is at a lower level than the first execution context (e.g., a frame existing within a frame). By way of further example, the first execution context may include code for executing a function, a call, or other computing element, that is executable within the second execution context. In some embodiments, the first execution context and/or second execution context may be represented by (e.g., may be generated by, implemented by, or implicated by) a frame (e.g., part of a JavaScript and/or browser environment, such as an iframe in a browser environment). The first execution context may be represented by a top frame and the second execution context may be associated with the top frame. For example, top frame may have a lower frame (or other coding element, such as a function, process, or API call) nested within (e.g., underneath) it, and the lower frame may be associated with the second execution context.

Figures 1A, 9:
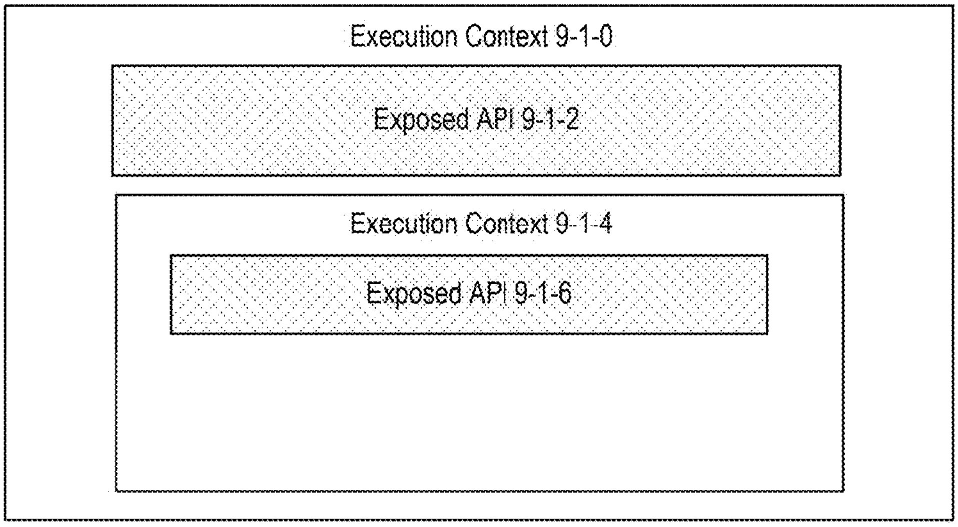
FIG. 9-1A illustrates an example of execution contexts with exposed APIs, consistent with some embodiments of the present disclosure.

For example, as shown in FIG. 9-1A, one execution context 9-1-0 may have an exposed API 9-1-2 (though, an execution context may have any number of exposed APIs, including zero). Execution context 9-1-0 may be associated with another execution context 9-1-4. For example, execution context 9-1-4 may be nested within execution context 9-1-0. Though, any number of execution contexts may exist within a scenario, and may have any combination of nestings (e.g., any number of nesting levels, any number of execution contexts nested within any given execution context). Execution context 9-1-0 and execution context 9-1-4 may have respective sources (e.g., indicated by source identifiers, which may be included in input code), which may be different sources or a same source, as discussed herein. Execution context 9-1-4 may also have its own exposed API, exposed API 9-1-6. Execution context 9-1-0 and/or execution context 9-1-4 may have associated input code (not depicted), consistent with disclosed embodiments.

In some embodiments, the first-execution-context input code may be the same as the second-execution-context input code. For example, the first-execution-context input code and the second-execution-context input code may be exactly the same, may include some same portions (e.g., functions, calls, lines of code), and/or may be configured to perform functionality within a similarity threshold (e.g., based on static analysis, dynamic analysis, code simulation). In some embodiments, the first-execution-context input code may be different from the second-execution-context input code. For example, the first-execution-context input code may include, relative to the second-execution-context input code, at least one differing function, call, API, object, reference, argument, or character of code language.

In some embodiments, the first execution context and the second execution context may be associated with separate computing processes. For example, the first computing process and the second computing process may be configured to execute code for implementing different purposes, accessing different memory locations, accessing different devices, accessing different sources, and/or changing different portions of code (included stored data). In some embodiments, the first computing process may be configured to execute within the first execution context and the second computing process may be configured to execute within the second execution context. In some embodiments, the separate computing processes may be executable by a same application (e.g., an interpreter-based application), or different applications.

In some embodiments, the first execution context and the second execution context may be associated with a same computing process. Two computing processes may be considered a same computing process when the two computing processes execute code for implementing a same purpose, access a same memory location, access a same device, access a same source (e.g., a web-based source), and/or change a same portion of code (including stored data), and/or are represented by a same string of text or other identifier. For example, one portion of code (e.g., input code) may be configured to execute a process with the first execution context and another portion of code (e.g., input code) may be configured to execute the same process with the second execution context.

Some disclosed embodiments may involve determining that the first execution context is associated with a first source differing from a second source associated with the second execution context. For example, the first execution context may be associated with a first source, such as a uniform resource locator (URL), a particular API, a particular function, a particular program, a particular library, or a particular application. The second execution context may be associated with a second source that differs from the first source in at least name or function. In some embodiments, the first source and the second source may be of a same or different type (e.g., a uniform resource locator (URL), a particular API, a particular function, a particular program, a particular library, or a particular application).

Some embodiments may involve executing a second intercepting code prior to execution of second-execution-context input code. This may include at least one of adding code, inserting code, deleting code, modifying code, replacing code, disabling code, performing any operation to configure the second intercepting code to influence the second-execution-context input code, or performing any operation discussed above regarding executing a first intercepting code prior to execution of first-execution-context input code. The second intercepting code may be configured to patch the at least one second-execution-context exposed API. Patching the at least one second-execution-context exposed API may include re-directing code associated with the at least one second-execution-context exposed API or other any aspect for causing the at least one exposed API to exhibit different functionality (e.g., different from functionality associated with original input code), as discussed above with respect to patching the at least one first-execution-context exposed API. For example, the patching may be implemented prior to the second input code having (or being permitted to have, such as by an interpreter-based application) access to the at least one second-execution-context exposed API.

In some embodiments, the first intercepting code may be the same as the second intercepting code. For example, the first intercepting code may include a same configuration for causing code to exhibit non-native functionality as the second intercepting code and/or may cause code to exhibit the same non-native functionality as the second intercepting code. In some embodiments, the first intercepting code may be executed prior to execution of the first-execution-context code, and the second intercepting code, which includes the same code as the first intercepting code (e.g., is a separate instance of the same code), may be executed prior to executing the second-execution-context code. Alternatively, the first intercepting code may be considered to also be the second intercepting code (e.g., a single instance is considered the first intercepting code and the second intercepting code), such that executing the first intercepting code prior to the first-execution-context input code is considered executing the second intercepting code prior to the second-execution-context input code (even though a single intercepting code is executed). In some embodiments, the first intercepting code is different from the second intercepting code. For example, the first intercepting code and the second intercepting code may include differing configurations for causing code to exhibit non-native functionality and/or may cause code to exhibit differing non-native functionalities.

In some embodiments, the execution of the second intercepting code may be based on the determination that the first execution context is associated with the first source differing from the second source associated with the second execution context, discussed above. For example, in response to determining that the first and second execution contexts have different sources, at least one processor may execute the second intercepting code to cause code associated with the second execution context (e.g., second-execution-context input code) to exhibit non-native functionality. Additionally or alternatively, at least one processor may be configured to determine that the first execution context is associated with a first source that is the same as the second source associated with the second execution context, and may, in response to this determination, forgo executing or otherwise implementing a second intercepting code. In some embodiments, intercepting code in addition to the first intercepting code may only be implemented for execution contexts having different sources (as determined by source identifiers, which may be contained within an iframe, for example). In this manner, intercepting code may still be effectively implemented for all execution contexts, but without duplicating intercepting code for execution contexts with a same source, which may reduce a number of instances of intercepting code (e.g., agents), saving memory usage.

Figures 1B, 9:
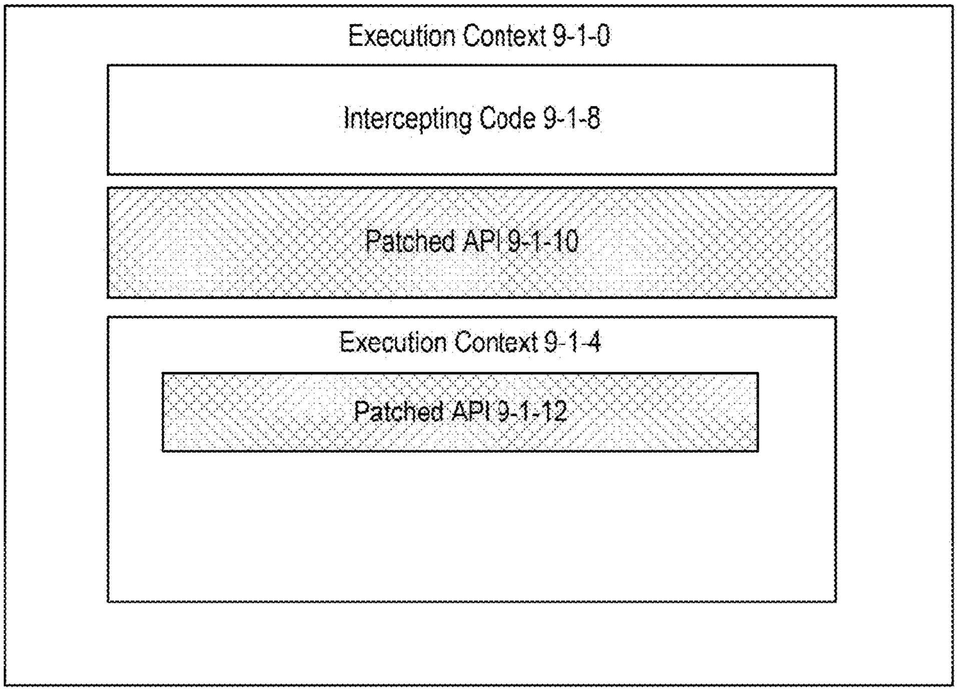

For example, as shown in FIG. 9-1B, an intercepting code 9-1-8 may be injected into, inserted into, executed in relation to, or otherwise associated with execution context 9-1-0. Intercepting code 9-1-8 may cause the patching of one or more exposed APIs. For example, intercepting code 9-1-8 may cause exposed API 9-1-2 to become a patched API 9-1-10. Intercepting code 9-1-8 may also cause exposed API 9-1-6 to become a patched API 9-1-12. Accordingly, a single intercepting code may patch multiple exposed APIs, which may exist in different execution contexts. Such a scenario may by implemented when execution context 9-1-0 and execution context 9-1-4 have a same source.

Figures 1C, 9:
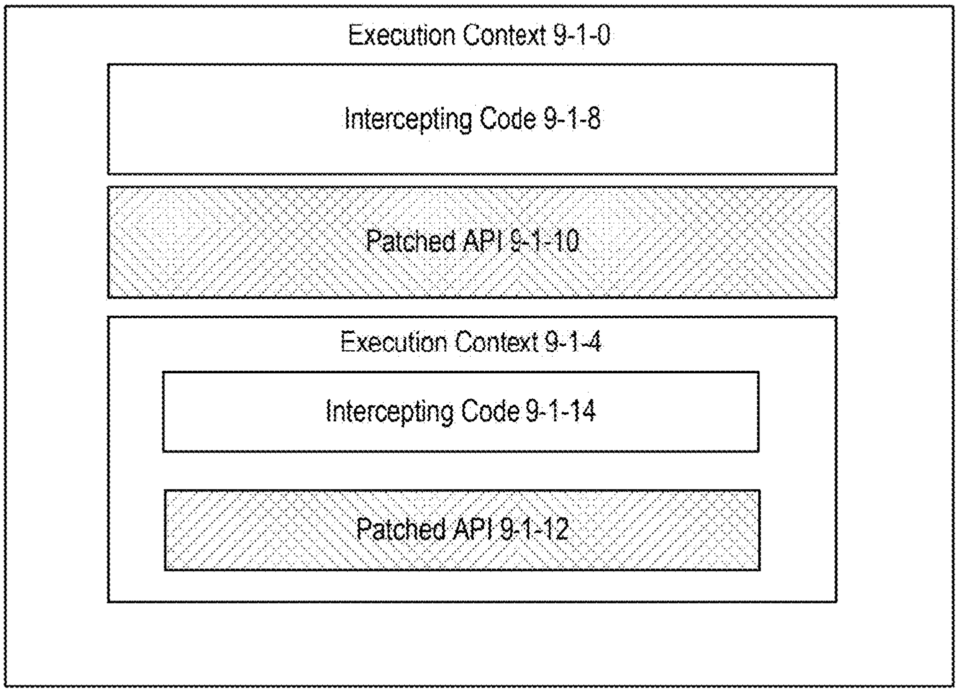
Figures 2, 9:
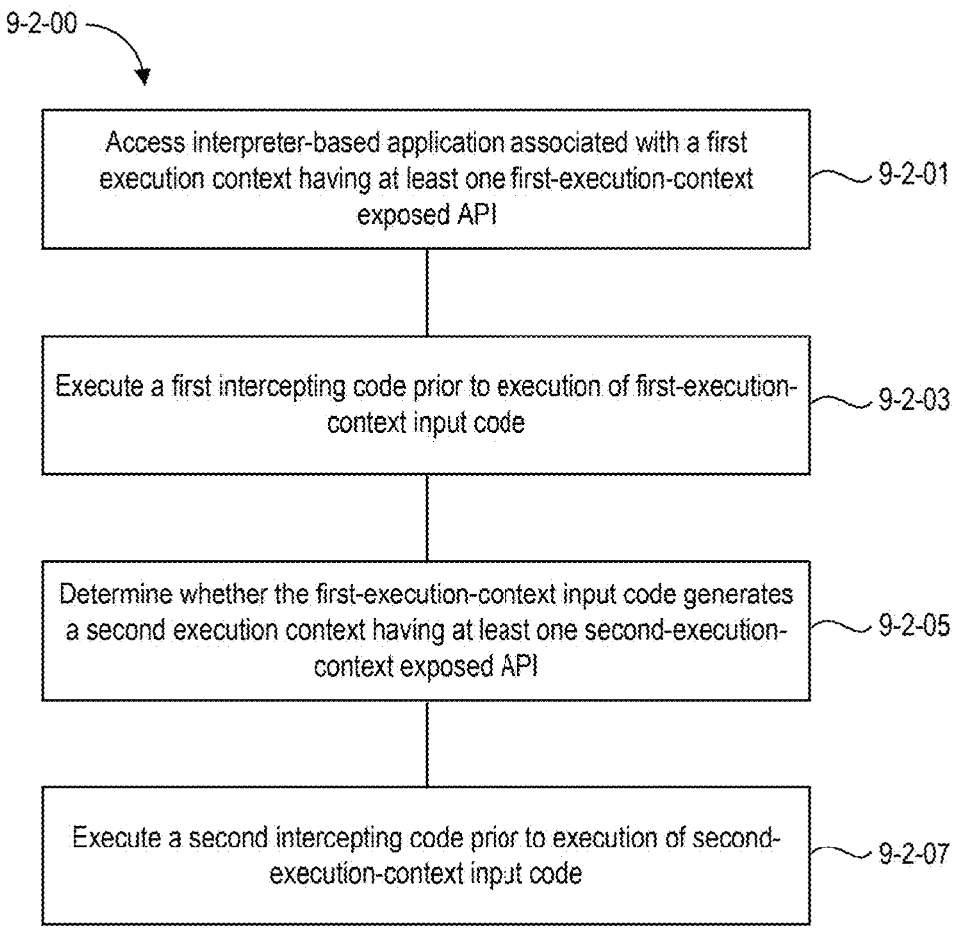

As a different example, as shown in FIG. 9-1C, an intercepting code 9-1-14 may be injected into, inserted into, executed in relation to, or otherwise associated with execution context 9-1-4. Intercepting code 9-1-14 may cause exposed API 9-1-6 to become a patched API 9-1-12. Also, intercepting code 9-1-8 may still cause exposed API 9-1-2 to become a patched API 9-1-10, as discussed with respect to FIG. 9-1B. Accordingly, separate intercepting codes may patch separate exposed APIs, which may exist in different execution contexts. Such a scenario may by implemented when execution context 9-1-0 and execution context 9-1-4 have different sources.

In some embodiments, at least one of executing the first intercepting code prior to execution of the first-execution-context input code or executing the second intercepting code prior to execution of the second-execution-context input code may include using at least one JavaScript agent. For example, executing the first intercepting code prior to execution of the first-execution-context input code may include executing at least one JavaScript agent, which may have been injected into or adjacent to the first-execution-context input code. Also, executing the second intercepting code prior to execution of the second-execution-context input code may include executing at least one JavaScript agent, which may have been injected into or adjacent to the second-execution-context input code. In some embodiments, an agent associated with a different interpreter-based language may be used, such as a Python agent, a Ruby agent, or any other interpreter-based language discussed herein.

Consistent with some disclosed embodiments, including those disclosed above, a computing device (e.g., processor 102 of FIG. 1) may perform operations for neutralizing malicious code, consistent with disclosed embodiments. The computing device may use any one of a number of components for performing the operations for neutralizing malicious code, such as an engine (e.g., JavaScript engine 130) or a proxy (e.g., proxy 148).

FIG. 9-2 illustrates a block diagram of an example process 9-2-00 for neutralizing malicious code, such as in scenarios with multiple execution contexts, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 9-2. In some embodiments, the process 9-2-00 may be performed by at least one processor (e.g., processor 102 of FIG. 1) of a computing device to perform operations or functions described herein. In some embodiments, some aspects of the process 9-2-00 may be implemented as software (e.g., program codes or instructions) that are stored in a memory (e.g., memory 110 in FIG. 1) or a non-transitory computer-readable medium. In some embodiments, some aspects of the process 9-2-00 may be implemented as hardware (e.g., a specific-purpose circuit). In some embodiments, the process 9-2-00 may be implemented as a combination of software and hardware.

FIG. 9-2 includes process blocks 9-2-01 to 9-2-07. At block 9-2-01, a processing means (e.g., processor 102 of FIG. 1) may access an interpreter-based application associated with a first execution context having at least one first-execution-context exposed API. At block 9-2-03, the processing means may execute a first intercepting code prior to execution of first-execution-context input code. At block 9-2-05, the processing means may determine whether the first-execution-context input code generates a second execution context having at least one second-execution-context exposed API. At block 9-2-07, the processing means may execute a second intercepting code prior to execution of second-execution-context input code.

Figure 10A:
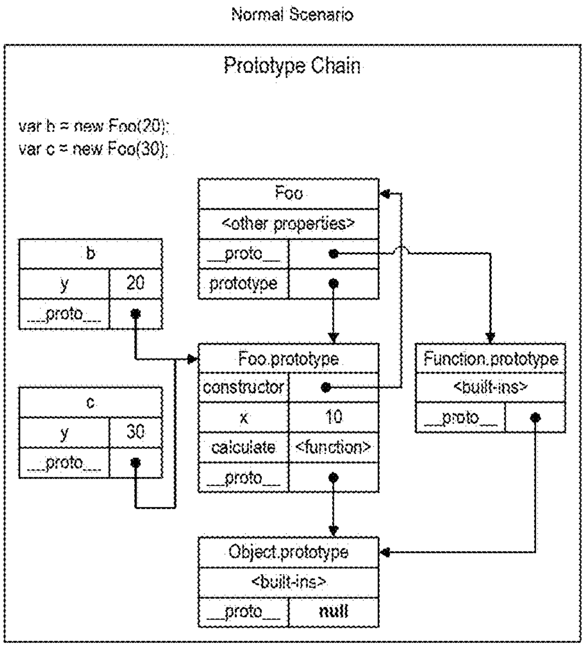
FIGS. 10A and 10B illustrate an exemplary implementation for manipulating a runtime environment by manipulating a prototype chain, consistent with some embodiments of the present disclosure.
Figure 10B:
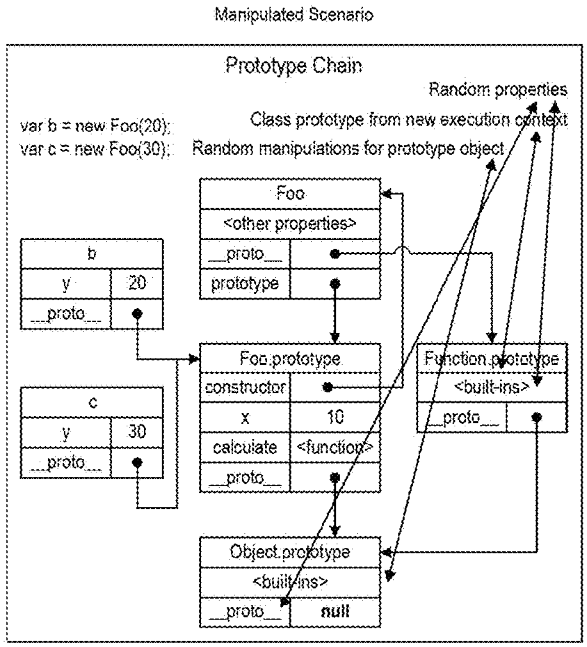

Reference is now made to FIGS. 10A and 10B, which illustrate an exemplary implementation for manipulating a runtime environment by manipulating a prototype chain, consistent with disclosed embodiments. FIG. 10A shows a 'normal' (e.g., native) prototype chain for creating a new object (e.g., FOO). FIG. 10B shows the same prototype chain for creating the new object, but with implementing several manipulations, such as by adding one or more random properties for the instance of the FOO object, creating the instance of the FOO object from a new execution context, and/or manipulating the prototype object (e.g., used as a template for creating the object instances) in order to change a native prototype lookup behavior.

Figure 11A:
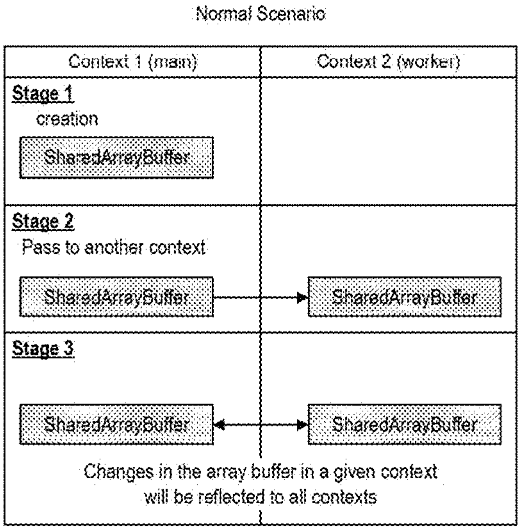
FIGS. 11A and 11B illustrate an exemplary implementation for manipulating a runtime environment via object shadowing, consistent with some embodiments of the present disclosure.
Figure 11B:
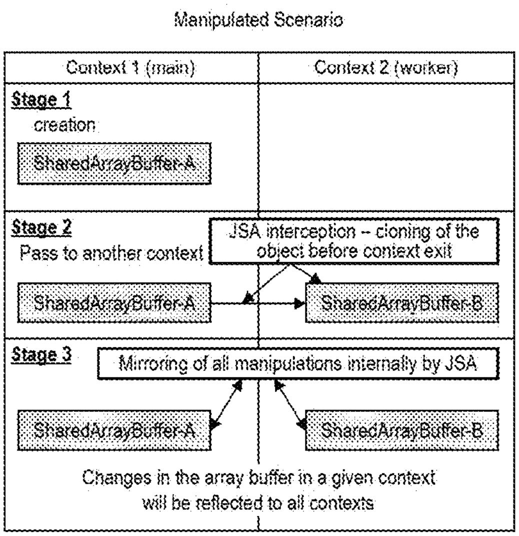

Reference is now made to FIGS. 11A and 11B, which illustrate an exemplary implementation for manipulating a runtime environment via object shadowing, consistent with disclosed embodiments. Referring to FIG. 11A, a normal scenario is shown with two execution contexts, "main" and "worker". In Stage 1, a SharedArrayBuffer is created in the main execution context. In Stage 2, the SharedArrayBuffer is passed to the worker execution context. In Stage 3, any changes made to the SharedArrayBuffer in one of the execution contexts is reflected in the other execution context. Referring to FIG. 11B, the execution environment has been manipulated. As in FIG. 11A, there are two execution contexts, "main" and "worker". In Stage 1, a SharedArrayBuffer is created in the main execution context. However, in Stage 2, the IBCA intercepts the native functionality, and creates a shadow, or "clone" of the SharedArrayBuffer. Instead of passing the original SharedArrayBuffer to the worker execution context, the clone of the SharedArrayBuffer is passed. Any manipulations performed by the IBCA on any of the original SharedArrayBuffer or the clone may be mirrored across both execution context. Any changes made to the SharedArrayBuffer in one of the execution contexts is reflected in the other execution context as in FIG. 11A, however, control of the manipulations is maintained by the IBCA.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for cybersecurity. Such systems may involve software that enables thwarting of malicious code or other cyber threats. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, non-transitory computer readable media, and methods for addressing cyber threats. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a system, method, or computer readable medium in many ways using building blocks, thereby permitting flexibility in constructing a product that suits desired needs.

Embodiments described herein may involve a non-transitory computer readable medium. A non-transitory computer-readable medium may refer to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals. Thus, non-transitory computer readable media may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as processing units, such as one or more processors or central processing units ("CPUs"), a memory, and one or more input/output interfaces. The computer platform may also include an operating system and instruction code. The various processes and functions described in this disclosure may be either part of the instruction code or part of the application program, or any combination thereof, which may be executed by a processor/CPU, whether or not such a computer or processor is explicitly shown. In addition, various other peripheral units may be connected to the computer platform such as an additional data storage unit.

Consistent with disclosed embodiments, a "processor" or "at least one processor" may include any physical device or group of devices having electric circuitry that performs a logic operation on an input or inputs. For example, a processor or at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although this disclosure presents specific embodiments, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium containing instructions that when executed by at least one processor cause the at least one processor to:

detect at least one interpreter-based application, wherein the at least one interpreter-based application is configured to exhibit native functionality and to generate a plurality of execution contexts following receipt of an original input code;

inject an interpreter-based cybersecurity agent within the at least one detected interpreter-based application, wherein the injected interpreter-based cybersecurity agent is configured for execution prior to execution of the original input code by the at least one interpreter-based application;

patch exposed application programming interfaces using the injected interpreter-based cybersecurity agent, wherein the patching is configured to cause the exposed application programming interfaces to become patched application programming interfaces that exhibit non-native functionality different from the native functionality, and wherein the non-native functionality differs for differing execution contexts of the at least one interpreter-based application in order to thwart exploitations;

intercept, using the injected interpreter-based cybersecurity agent, an invocation of the patched application programming interfaces; and split arguments of the invocation into a plurality of memory arrays corresponding to the plurality of execution contexts.

2. The non-transitory computer readable medium of claim 1, wherein the injected interpreter-based cybersecurity agent is configured for execution prior to execution of the original input code with each of the plurality of execution contexts.

3. The non-transitory computer readable medium of claim 1, wherein injecting the interpreter-based cybersecurity agent occurs in each of the plurality of execution contexts before the original input code is executed by the at least one interpreter-based application.

4. The non-transitory computer readable medium of claim 1, wherein the instructions cause the at least one processor to detect the original input code in transit, and wherein injecting the interpreter-based cybersecurity agent occurs at a top portion of the original input code to generate a modified input code and to thereby enable the interpreter-based cybersecurity agent to be executed before the original input code is executed.

5. The non-transitory computer readable medium of claim 4, wherein detecting the original input code occurs via a local proxy.

6. The non-transitory computer readable medium of claim 4, wherein detecting the original input code occurs via a local virtual private network server.

7. The non-transitory computer readable medium of claim 4, wherein detecting the original input code occurs via a native application configured to monitor files associated with the at least one interpreter-based application.

8. The non-transitory computer readable medium of claim 1, wherein patching the exposed application programming interfaces cause unpredictable manipulations of at least one of the exposed application programming interfaces.

9. The non-transitory computer readable medium of claim 1, wherein the instructions cause the at least one processor to record changes caused by the non-native functionality to thereby enable reconstruction of original functionality.

10. A method for performing cybersecurity operations, the method comprising:

detecting at least one interpreter-based application, wherein the at least one interpreter-based application has a plurality of execution contexts and is configured to exhibit native functionality;

injecting an interpreter-based cybersecurity agent within the at least one detected interpreter-based application, wherein the injected interpreter-based cybersecurity agent is configured for execution prior to code associated with the at least one interpreter-based application;

patching exposed application programming interfaces using the injected interpreter-based cybersecurity agent, wherein the patching is configured to cause the exposed application programming interfaces to become patched application programming interfaces that exhibit non-native functionality different from the native functionality, and wherein the non-native functionality differs for differing execution contexts of the at least one interpreter-based application in order to circumvent exploitations;

intercepting, using the injected interpreter-based cybersecurity agent, an invocation of the patched application programming interfaces; and splitting arguments of the invocation into a plurality of memory arrays corresponding to the plurality of execution contexts.

11. The method of claim 10, further comprising executing the injected interpreter-based cybersecurity agent prior to code associated with each of the plurality of execution contexts.

12. The method of claim 10, further comprising injecting the interpreter-based cybersecurity agent in each of the plurality of execution contexts before other code is executed by the at least one interpreter-based enabled application.

13. The method of claim 10, further comprising detecting original input code in transit, and injecting the interpreter-based cybersecurity agent at a top portion of the input code to generate a modified input code and to thereby enable the interpreter-based cybersecurity agent to be executed before the original input code is executed.

14. The method of claim 10, further comprising causing unpredictable manipulations of at least one of the exposed application programming interfaces via the patching.

15. The method of claim 10, further comprising recording changes caused by the non-native functionality to thereby enable reconstruction of the native functionality.

16. A system for performing cybersecurity operations, comprising:

at least one processor configured to:

detect at least one interpreter-based application stored in at least one memory, wherein the at least one interpreter-based application has a plurality of execution contexts and is configured to exhibit native functionality, inject an interpreter-based cybersecurity agent within the at least one detected interpreter-based application, wherein the injected interpreter-based cybersecurity agent is configured for execution prior to code associated with the interpreter-based application;

patch exposed application programming interfaces using the injected interpreter-based cybersecurity agent, wherein the patching is configured to cause the exposed application programming interfaces to become patched application programming interfaces that exhibit non-native functionality different from the native functionality, and wherein the non-native functionality differs for differing execution contexts of the interpreter-based application in order to circumvent exploitations; and intercept, using the injected interpreter-based cybersecurity agent, an invocation of the patched application programming interfaces; and split arguments of the invocation into a plurality of memory arrays corresponding to the plurality of execution contexts.

17. The system of claim 16, wherein the at least one processor is further configured to detect original input code in transit and inject the interpreter-based cybersecurity agent at a top portion of the original input code to generate a modified input code and to thereby enable the interpreter-based cybersecurity agent to be executed before the original input code is executed.

18. The system of claim 17, wherein detecting the original input code occurs via at least one of: a local proxy, a local virtual private network server, a native application configured to monitor interpreter-based language files.

* * * * *